US009512815B2

United States Patent
Bae

(10) Patent No.: US 9,512,815 B2
(45) Date of Patent: Dec. 6, 2016

(54) MULTIPURPOSE ROTARY DEVICE AND GENERATING SYSTEM INCLUDING SAME

(76) Inventor: Myung-soon Bae, Gumi-si (KR)

( * ) Notice: Subject to any disclaimer, the term of this patent is extended or adjusted under 35 U.S.C. 154(b) by 444 days.

(21) Appl. No.: 14/008,878

(22) PCT Filed: Mar. 16, 2012

(86) PCT No.: PCT/KR2012/001917
§ 371 (c)(1),
(2), (4) Date: Sep. 30, 2013

(87) PCT Pub. No.: WO2012/148082
PCT Pub. Date: Nov. 1, 2012

(65) Prior Publication Data
US 2014/0044521 A1 Feb. 13, 2014

(30) Foreign Application Priority Data

Apr. 28, 2011 (KR) .................. 10-2011-0040242

(51) Int. Cl.
F03B 3/18 (2006.01)
F03B 17/06 (2006.01)
F03D 3/04 (2006.01)

(52) U.S. Cl.
CPC ............ F03B 3/183 (2013.01); F03B 17/063 (2013.01); F03D 3/0409 (2013.01);
(Continued)

(58) Field of Classification Search
CPC ....... F03D 3/0409; F03B 3/183; F03B 17/063; F05B 2240/121; F05B 2240/244; Y02E 10/28; Y02E 10/74
See application file for complete search history.

(56) References Cited

U.S. PATENT DOCUMENTS

| 1,248,305 | A | * | 11/1917 | Gallagher | ............. | F04D 29/462 |
| | | | | | | 415/147 |
| 4,486,143 | A | * | 12/1984 | McVey | ................. | F03D 3/0427 |
| | | | | | | 415/162 |

(Continued)

FOREIGN PATENT DOCUMENTS

| AU | 494602 | 1/1977 |
| DE | 20 2010 012 708 | 1/2011 |

(Continued)

OTHER PUBLICATIONS

International Search Report for International Application No. PCTG/KR2012/0001917, dated Sep. 26, 2012.

Primary Examiner — Igor Kershteyn
(74) Attorney, Agent, or Firm — Kile Park Reed & Houtteman PLLC

(57) ABSTRACT

A multipurpose rotary device includes a rotor configured to include a plurality of blades in a circumferential direction; and a load guide body configured to guide a flow of fluids flowing into the inside of the rotor, wherein the load guide body includes an upper support member and a lower support member configured to be disposed to face each other at the upper and lower sides thereof and connected to one another such that the rotor is rotatably installed; load guide plates configured to correspond to the blades and are rotatably installed between the upper and lower support members in a longitudinal direction; and stop pins configured to be formed on inner surfaces facing the upper and lower support members to control a rotational angle of the load guide plates.

19 Claims, 31 Drawing Sheets

(52) U.S. Cl.
CPC ... *F05B 2240/121* (2013.01); *F05B 2240/244* (2013.01); *Y02E 10/28* (2013.01); *Y02E 10/74* (2013.01)

(56) References Cited

U.S. PATENT DOCUMENTS

| | | | | |
|---|---|---|---|---|
| 5,380,149 | A * | 1/1995 | Valsamidis | F03D 3/0409 415/2.1 |
| 5,391,926 | A * | 2/1995 | Staley | F03D 3/0409 290/44 |
| 6,465,899 | B2 * | 10/2002 | Roberts | F03D 3/0409 290/44 |
| 6,740,989 | B2 * | 5/2004 | Rowe | F03D 3/0409 290/44 |
| 6,870,280 | B2 * | 3/2005 | Pechler | F03D 3/0427 290/44 |
| 7,397,144 | B1 * | 7/2008 | Brostmeyer | F03B 13/20 290/42 |
| 2007/0020097 | A1 | 1/2007 | Ursua | |
| 2009/0289459 | A1 * | 11/2009 | Chung | F03D 3/0427 290/55 |
| 2009/0322091 | A1 | 12/2009 | Jack | |
| 2010/0213722 | A1 * | 8/2010 | Scott | F03D 3/0409 290/55 |

FOREIGN PATENT DOCUMENTS

| | | |
|---|---|---|
| DE | 20 2010 016 013 | 3/2011 |
| EP | 1 375 910 | 1/2004 |
| EP | 1 398 500 | 3/2004 |
| GB | 2 456 872 | 8/2009 |
| JP | 60-65282 | 4/1985 |
| JP | 61-38173 | 2/1986 |
| JP | 7-35765 | 7/1995 |
| JP | 2002-364517 | 12/2002 |
| JP | 2004-108365 | 4/2004 |
| JP | 2005-54695 | 3/2005 |
| JP | 2005-188494 | 7/2005 |
| JP | 2005-315265 | 11/2005 |
| JP | 2006-207566 | 8/2006 |
| JP | 2006-307815 | 11/2006 |
| JP | 2007-64207 | 3/2007 |
| JP | 2008-25518 | 2/2008 |
| JP | 2008-63960 | 3/2008 |
| JP | 2008-64106 | 3/2008 |
| JP | 3160457 | 6/2010 |
| KR | 10-2004-0077825 | 9/2004 |
| KR | 10-2010-0027571 | 3/2010 |
| KR | 10-2010-0136382 | 12/2010 |
| WO | 2010/123400 | 10/2010 |
| WO | 2010/139188 | 12/2010 |

* cited by examiner

MULTIPURPOSE ROTARY DEVICE AND GENERATING SYSTEM INCLUDING SAME

TECHNICAL FIELD

The present invention relates to a multipurpose rotary device and a generating system including the same, and more particularly, to a multipurpose rotary device configured to guide effectively even or uneven and remarkably rugged loads that are obtained from flow energy of the various fluids generated in the ground, streams, the sea, and the like to maximize rotational efficiency, and thereby generating clean energy with high efficiency, without harming the global environment, and a generating system including the same.

BACKGROUND ART

At the present day, as pre-existing fossil energy resources are gradually exhausted and environmental issues come to the fore, the researches that want to use effectively clean alternative energy, in particular, the loads obtained from water power, tidal power, wave power, and the like and the loads caused due to wind power have been actively conducted from a long time ago.

As representative method and devices, there are the water power generating method that uses dam, the tidal power generating device that uses ebb and flood of seawater caused due to gravitation of the Moon, the wave power generating device that uses the vertical movement of the waves, and the like. In addition, there are the horizontal axis wind power generating device and the vertical axis wind power generating device that use wind power. Clean energy using such devices is effectively utilized all over the world, but it can be seen that the fields to be improved are infinite.

In this way, the researches on the generation technology using energy of water power or tidal power and wave power have actively been carried out. However, as problems in the researches using tidal power, there are problems such as difficulties caused due to the load directions and the heights of the loads to be varied and a huge amount of investment costs as well as construction of the method of constructing the bay. In addition, the basic principles of the wave power generation that utilizes the loads of the uneven waves in wave power are studied a long time ago. However, due to various technical difficulties such as difficulties of structure installation in the remarkably changed sea, the researches on the generation technology currently remain still in a trial stage.

In addition, the water power generation has been utilized for a long time, but due to difficulties such as limitation of the additional water power generation construction place and a huge amount of costs, in recent times, small hydropower plants and ultra-small hydropower plants that construct by closing stank in the river or streams is developed. However, a method of blocking a waterway has the environmental issues leading to destruction in ecosystem such as blocking the movement of the fish.

Meanwhile, the most general horizontal axis wind power generating device in wind power has a high efficiency structure using a lift force. However, as the biggest problem, there is limitation of an installation place that has excellent wind quality, which is continuously blown in a certain direction, because the rotation direction may be changed depending on the direction of the wind. It is difficult to cause a lift force in a case of the wind having a certain wind speed or less, and the device is stopped in order to protect the device in a case of the stiff wind having a certain wind speed or more. There is a problem in which a heavy generator is installed at a pillar of a high position. Therefore, there are difficulties in which costly installation costs due to the devices used to compensate for the problems are required. In addition, in a case of the vertical axis wind power generating device that is not affected by the direction of the wind, there is a problem in which the loads of action and reaction are exerted to the loads that are exerted in all direction based on the central axis to decrease efficiency thereof. The type of device is classified into a drag type that is efficient in a case of the low speed wind and a lift force type that is efficient in a case of the high speed wind. However, the vertical axis wind power generating device has the structure with low efficiency and is in the real state having difficulties in the large-scale generating.

Therefore, in order to overcome the low efficiency that is a weakness of a vertical type, in recent years, many studies have been conducted. For example, a method of using a savonius type and a darrieus type together, and study activities such as development of a mechanical shape of a blade in a case of a savonius type configured to use a drag or attaching an auxiliary device configured to guide partially the wind to the outside are conducted. In a case of a method of using a lift force, design, structure, or an assembly method of a blade is improved, or an angle change device of an angle of attack for a blade is developed. Therefore, the devices for increasing the effectiveness of the vertical axis generating device have been developed.

However, in a case of an auxiliary device configured to guide the wind to a device using a drag in a rotation manner, as the scale of the device is larger, there is a problem in which the rapid response for a wind direction is not efficient at a place in which the wind direction is frequently varied, and the fact in which the structure and the configuration for wind guide vanes and internal blades is not efficient, and thus is not practical. In a case of the low speed, the angle change devices of the angle of attack are applicable to the blades using a lift force. However, substantially, when the difference in loads is remarkable or during high-speed rotation, it is difficult to respond effectively and rapidly. Therefore, the higher efficiency is not obtained.

Meanwhile, FIG. 1a is a diagram illustrating a first example of a conventional rotary device. As illustrated in the drawing, if the loads are generated in an arrow direction using a center output shaft 4 as a starting point, of a portion 'a1' and a portion 'a2' that are divided based on a vertical line 1A drawn toward a center of the output shaft 4 in the flow direction of the fluids, the loads are exerted to the portion 'a1' as action, but the loads are exerted to the portion 'a2' of the other side as reaction. Therefore, there is a problem in which only a minute rotational force corresponding to efficiency obtained due to a curve shape of blades 5 is obtained from a rotor 1.

In addition, FIG. 1b is a diagram illustrating a second example of a conventional rotary device. As illustrated in the drawing, due to a load guide device 2 configured as curved guide plates 6 outside a rotor 1, the load of an area as wide as 'b1' can be guided. However, the guide plates 6 of the outside load guide device 2 are formed in a curved shape. Therefore, the loads guided to the inside along the curve are exerted to a center direction of an output shaft 4 of the rotor 1. As such, a structure in which a large rotational force is not obtained is provided.

FIG. 1c is a diagram illustrating a third example of a conventional rotary device. As illustrated in the drawing, due to a load guide device 2a configured as guide plates 6a that have a straight line structure and are diagonally disposed to the outside of a rotor 1, it may be seen that the loads are effectively guided. However, from the viewpoint of a structure of the blades 6a of the rotor 1, the loads that are guided to a portion 'c2' located far away from a center output shaft 4 generate a large rotational force, but the portion 'c1' is located at a short distance from the output shaft 4, and has limitation in which, from the viewpoint of a structure of the blades 6a of the rotor 1, it is difficult to obtain a large rotational force.

DISCLOSURE

Technical Problem

The present invention is made in order to solve the above-mentioned conventional problems, and an object of the present invention is to provide a multipurpose rotary device configured to guide effectively even or uneven and remarkably rugged loads that are obtained due to flow energy of the various fluids generated from the ground, streams, the sea, and the like to maximize rotational efficiency, and thereby generating clean energy with high efficiency, without harming the global environment, and a generating system including the same.

Technical Solution

One aspect of the present invention provides a multipurpose rotary device including: a rotor that includes a plurality of blades in a circumferential direction; and a load guide body that guides a flow of fluids flowing into the inside of the rotor, wherein the load guide body includes an upper support member and a lower support member that are disposed to face each other at the upper and lower sides thereof and connected to one another such that the rotor is rotatably installed; load guide plates that correspond to the blades and are rotatably installed between the upper and lower support members in a longitudinal direction; and stop pins that are formed on inner surfaces facing the upper and lower support members to control a rotational angle of the load guide plates, and wherein the stop pins are configured as inside stop pins and outside stop pins such that a space in which the load guide plates are rotated is defined, and are configured to be distributed equally in a circular shape in a number corresponding to the load guide plates, and wherein the load guide plates are rotatably inserted by a space between the stop pins, have guide plate hinge members having a hinge shaft insertion hole that are coupled to the upper and lower ends, and are rotatably installed at the upper and lower support members by a guide plate rotary shaft bolt fastened to the hinge shaft insertion hole.

Another aspect of the present invention provides a multipurpose rotary device including: a rotor that includes a plurality of blades in a circumference direction; and a load guide body that guides a flow of fluids flowing into the inside of the rotor, wherein the load guide body includes an upper support member and a lower support member that are disposed to face each other at the upper and lower sides thereof, and connected to one another such that the rotor is rotatably installed; and load guide plates that are installed to correspond to the blades between the upper and lower support members.

Another aspect of the present invention provides a multipurpose rotary device including: a rotor configured to include a plurality of blades in a circumferential direction; and a load guide body that guides a flow of fluids flowing into the inside of the rotor, wherein the load guide body includes an upper support member and a lower support member that are disposed to face each other at the upper and lower sides thereof, and connected to one another such that the rotor is rotatably installed; an upper base plate and a lower base plate that are formed to be extended from the upper support member and the lower support member; load guide plates that are disposed to guide the loads of the fluids into a space between the upper base plate and the lower base plate that corresponds to an inflow direction of the fluids using the blades; and resistance prevention plates that that are disposed at both edges of a flow path of the fluids in the flow direction of the fluids, and are connected and installed to the load guide plates to minimize a rotational resistance of the rotor.

Another aspect of the present invention provides a generating system that includes a multipurpose rotary device including: the multipurpose rotary device according to any one of the above-mentioned aspects; and a rotary device installation structure configured such that the multipurpose rotary device is installed.

Also, the rotary device installation structure may include a water floating body that has a buoyancy chamber to be floated on water; and fixing means that has at least one connecting wire having one end connected to the water floating body and a weight body connected to the other end of the connecting wire to fix the water floating body such that the water floating body is rocked or turned over on water.

Advantageous Effects

According to a multipurpose rotary device of the present invention, since even or uneven and remarkably rugged loads that are obtained due to flow energy of the various fluids generated from the ground, streams, the sea, and the like are effectively guided to a rotor using a non-conductive guide body, and thereby a rotational force (rotational moment) can be obtained, clean electrical energy with high efficiency can be generated without harming the global environment. In particular, since the loads are simultaneously exerted to a plurality of blades that are located at the edge portion spaced apart from a center (axis) of a rotor, there is an effect in which a large rotational force can be obtained.

Also, in consideration of characteristics (density, etc.) of the fluids (air, water, etc.) flowing into a load guide body or the size (flow velocity, etc.) of the loads, since the blades of the rotor can be easily replaced with lift force blades, drag blades, hybrid blades, and the like and configured, depending on various environments and places or capacities, a high-power multipurpose rotary device can be implemented.

In addition, since a loading amount flowing into the rotor can be adjusted or blocked by load adjustment opening and closing means, in a case of performing maintenance work or in the event of natural disasters such as typhoon, tidal waves, there is an advantage that can close the load guide plates such that the fluids are not flowing into the inside of the rotor to protect safely the multipurpose rotary device.

Meanwhile, a generating system including the multipurpose rotary device according to the present invention not only can convert and produce all of the loads of wave power, tidal power, and wind power generated on the sea into electrical energy, but also can be effectively used as an offshore generating system because it has a lighthouse chamber. In particular, since a water floating body has a hollow structure, the generating system is easily moved.

When water is injected into the internal space after the generating system is moved at the installation place, since the generating system is more firmly fixed according to the weight of water, even though the generating system is located on the sea, the generating system can be maintained in a stable installation state without being rocked or turned over due to typhoon or tidal waves.

DESCRIPTION OF DRAWINGS

FIG. 2c is a cross-sectional view taken along line G-G of FIG. 2a;

FIG. 3c is a cross-sectional view taken along line H-H of FIG. 3a;

FIG. 3d is an enlarged and exploded perspective view of a portion B in FIG. 3a;

FIG. 4d is an enlarged cross-sectional view of a portion D in FIG. 4a;

FIG. 5c is a cross-sectional view taken along line J-J of FIG. 5a;

MODE FOR INVENTION

Best Mode for Carrying Out the Present Invention

Hereinafter, a description of multipurpose rotary devices according to exemplary embodiments of the present invention and a generating system that will be described in detail with reference to the accompanying drawings is as follows.

Figure 1A:
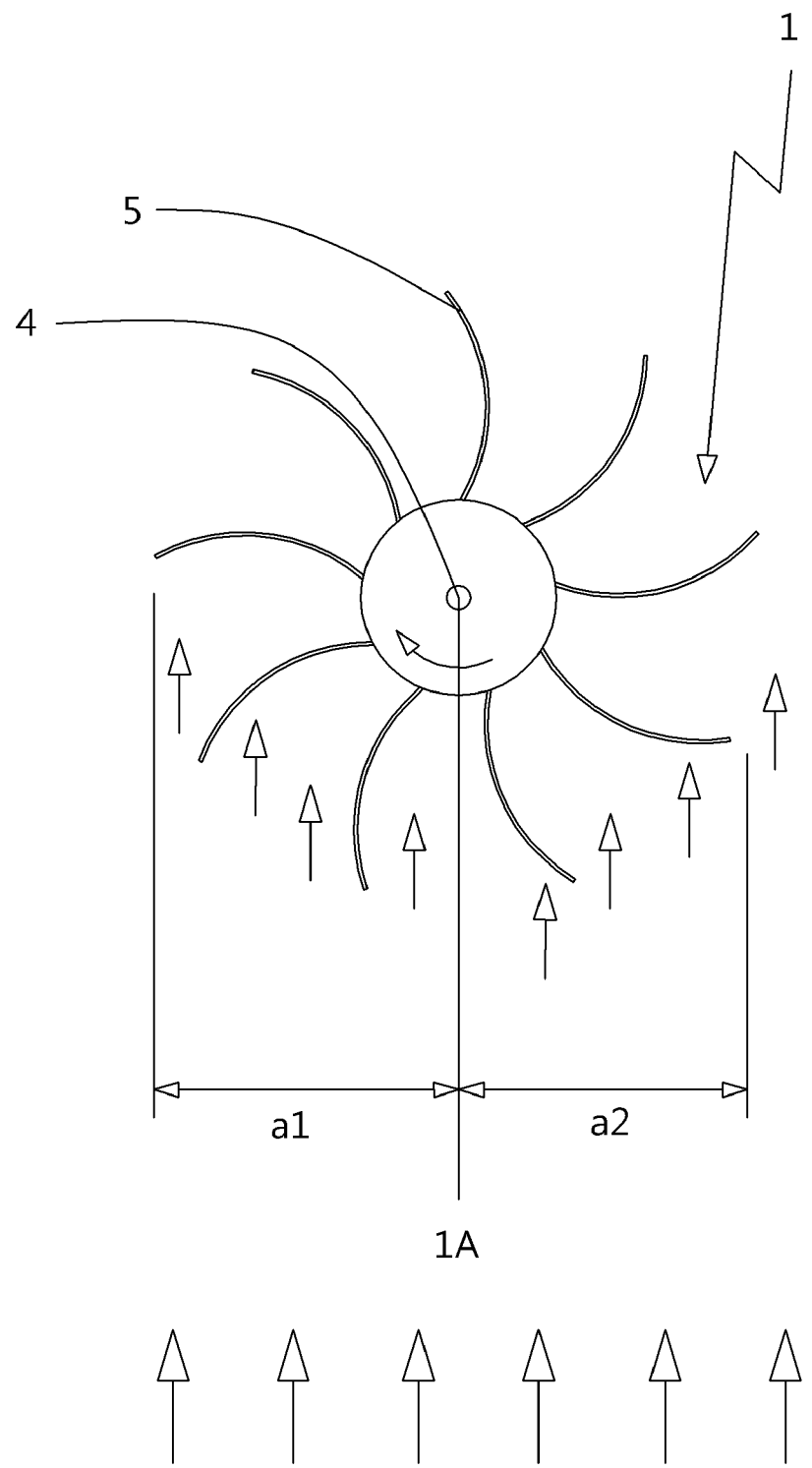
FIG. 1a to FIG. 1c are diagrams illustrating a conventional rotary device.
Figure 1B:
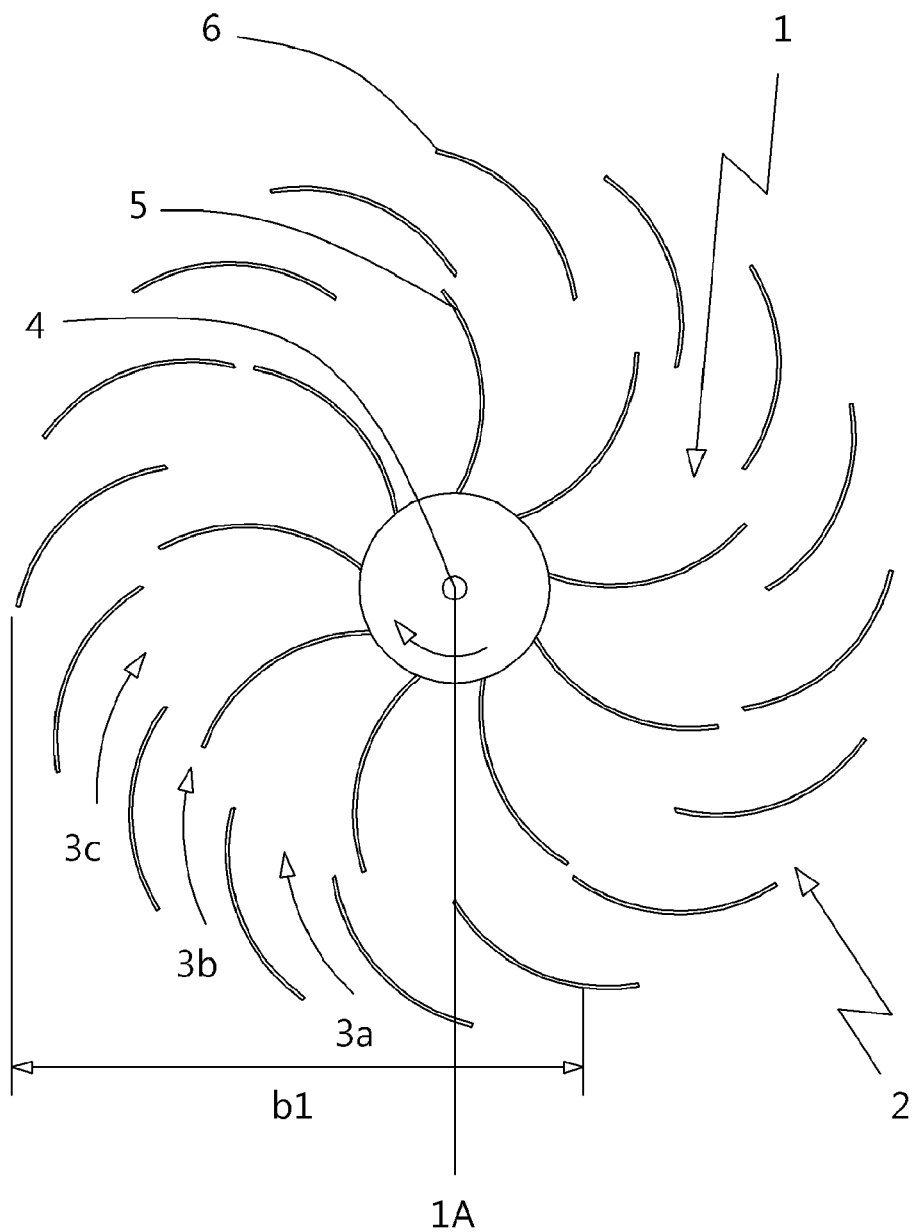
Figure 1B:
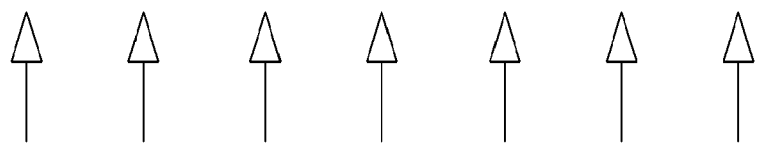
Figure 1C:
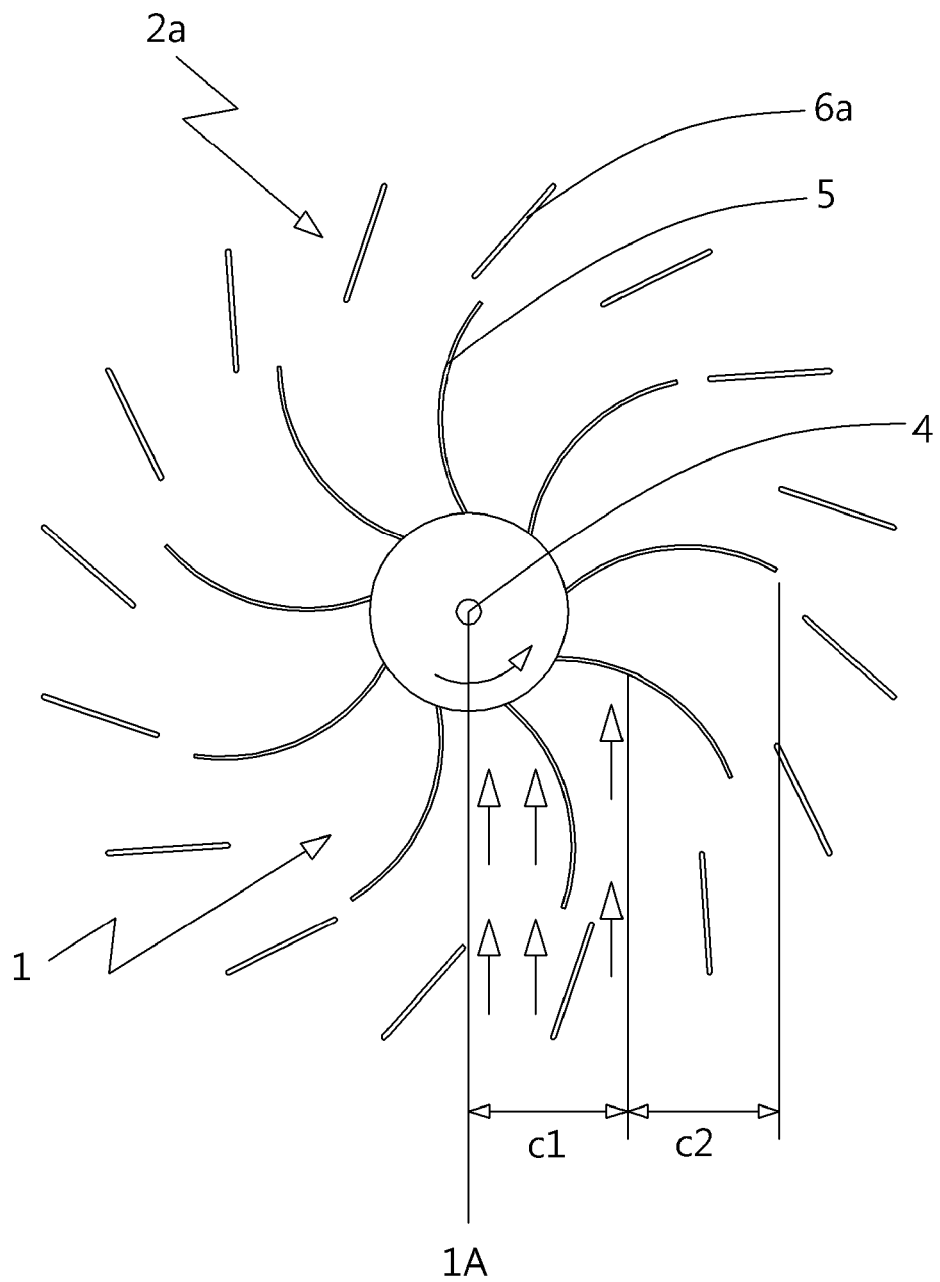
Figure 2A:
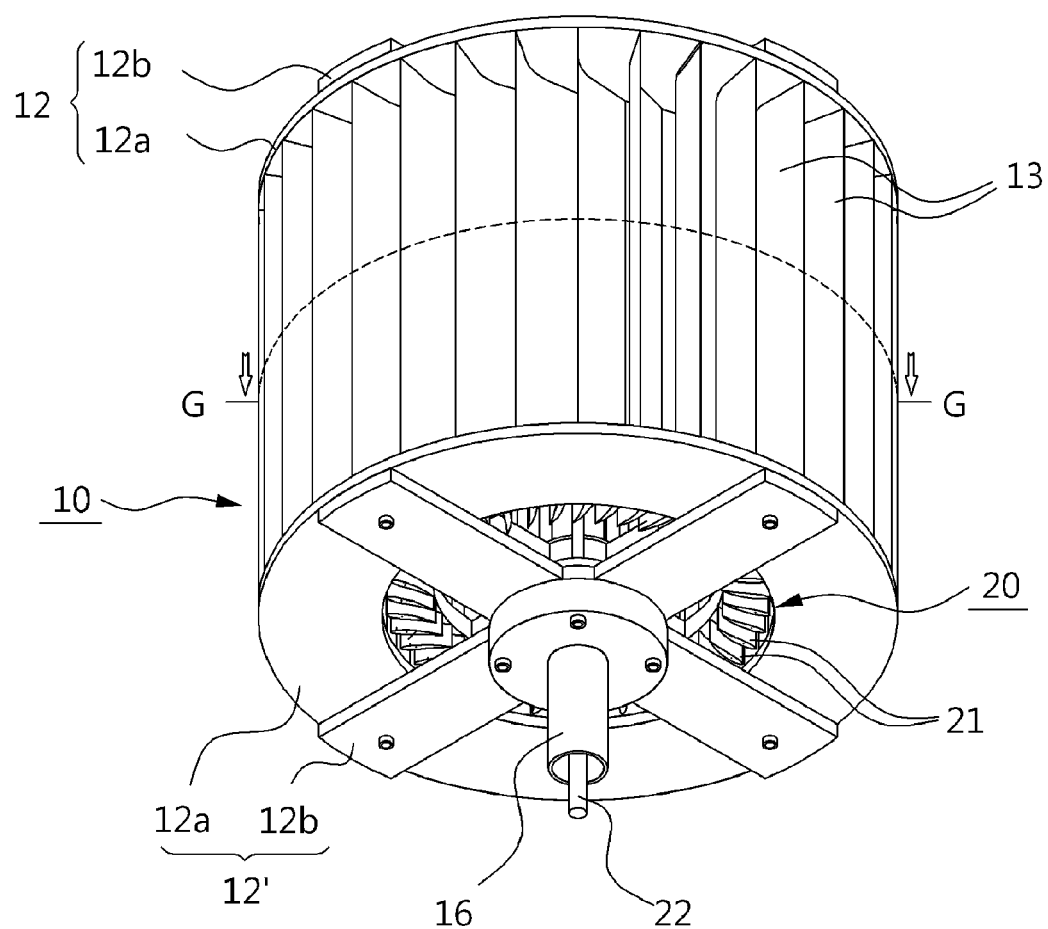
FIG. 2a is a perspective view illustrating a multipurpose rotary device according to a first embodiment of the present invention.
Figure 2B:
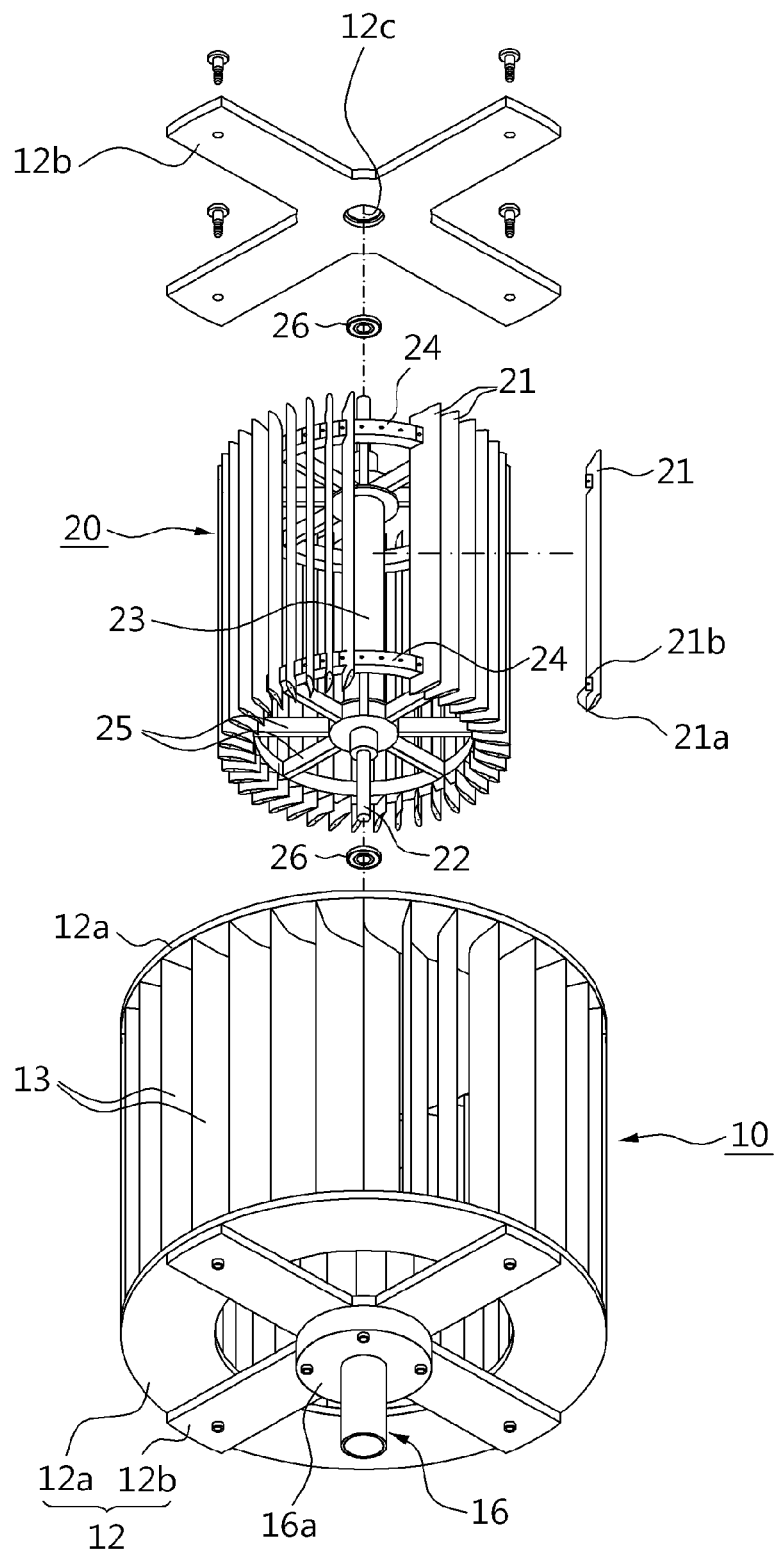
FIG. 2b is an exploded perspective view illustrating the multipurpose rotary device according to the first embodiment of the present invention.
Figure 2C:
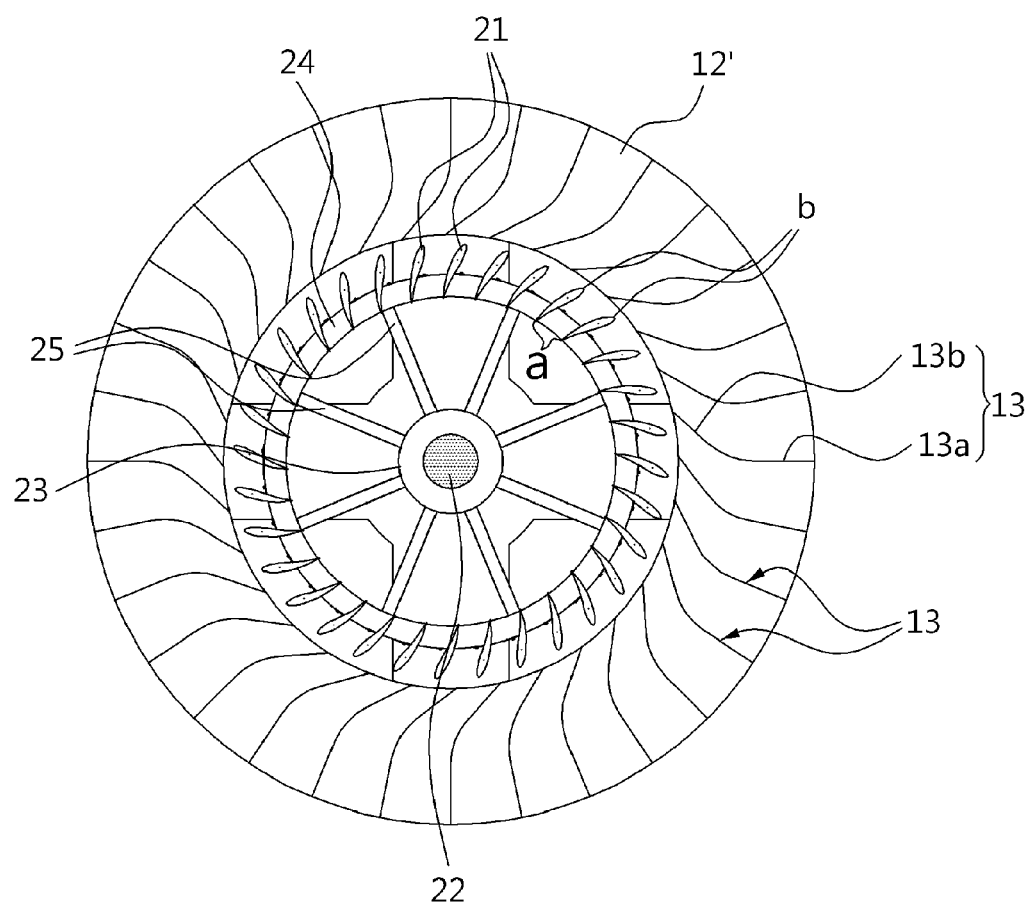
Figure 2D:
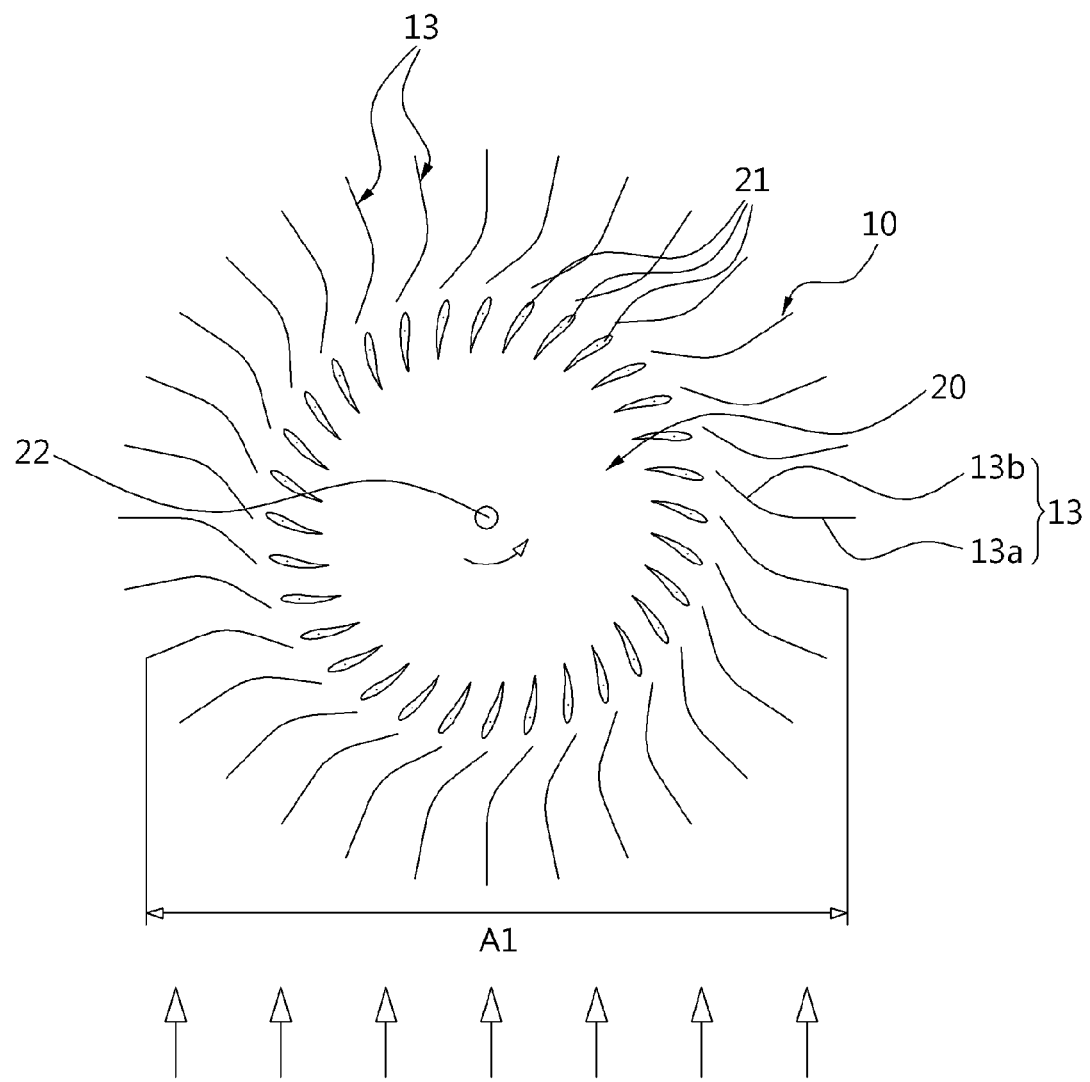
FIG. 2d is a schematic plan view illustrating an action of the multipurpose rotary device according to the first embodiment of the present invention.
Figure 2E:
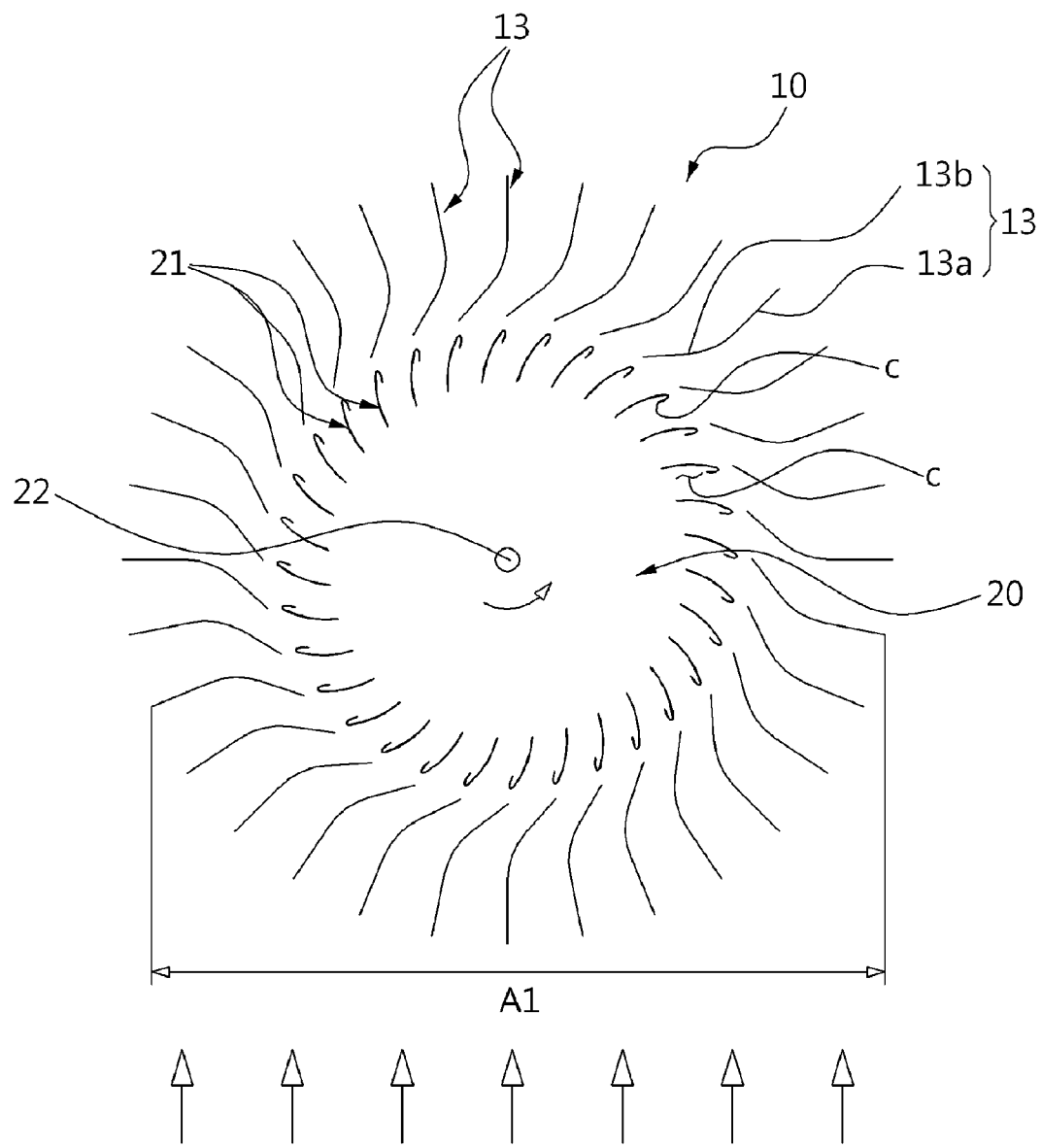
FIG. 2e and FIG. 2f are diagrams illustrating other examples of blades applicable to the multipurpose rotary device according to the first embodiment of the present invention.
Figure 2F:
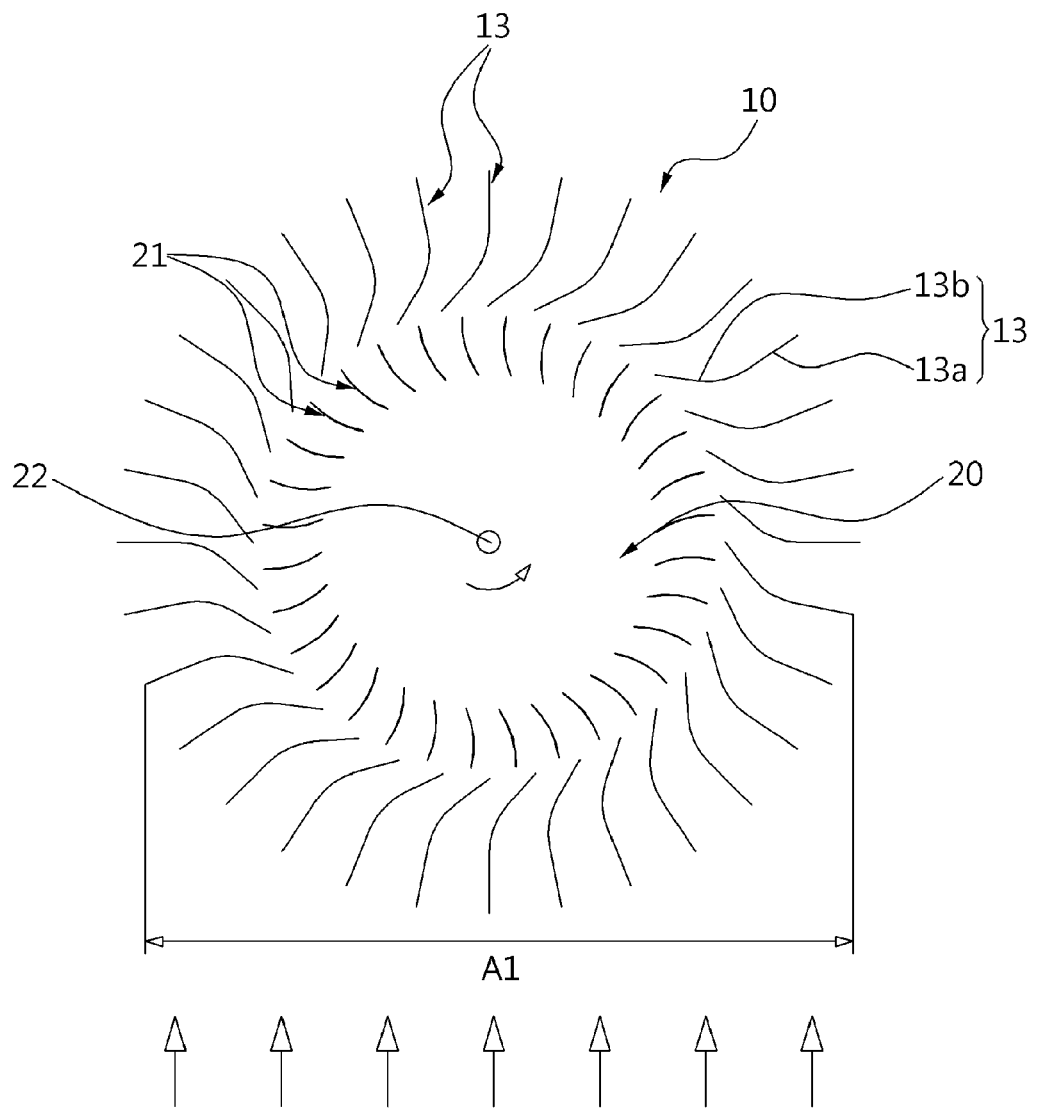

FIG. 2a is a perspective view illustrating a multipurpose rotary device according to a first embodiment of the present invention, FIG. 2b is an exploded perspective view illustrating the multipurpose rotary device according to the first embodiment of the present invention, FIG. 2c is a cross-sectional view taken along line G-G of FIG. 2a, FIG. 2d is a schematic plan view illustrating an action of the multipurpose rotary device according to the first embodiment of the present invention, and FIG. 2e and FIG. 2f are diagrams illustrating other examples of blades applicable to the multipurpose rotary device according to the first embodiment of the present invention.

Referring to FIG. 2a to FIG. 2f, the multipurpose rotary device 1R according to the first embodiment of the present invention is a device configured such that a stable unidirectional rotational force (rotational moment) with high efficiency in an even and uneven load or an irregular load, in which the position is remarkably changed, that is obtained from nature such as water power, wave power, tidal power, and wind power can be acquired irrespective of a load inflow direction, and includes a load guide body 10 and a rotor 20.

The load guide body 10 includes an upper support member 12 and a lower support member 12' that are disposed to face each other at the upper and lower sides thereof and connected to one another such that the rotor 20 is rotatably installed, and a plurality of load guide plates 13 that are disposed in a longitudinal direction configured such that a circle is formed between the upper and lower support members 12 and 12' to correspond to blades 21 of the rotor 20.

The upper support member 12 and the lower support member 12' are formed in the same or similar form such that they coupled to each other in a correspondence manner, and include annular rings 12a having diameters in which a plurality of load guide plates 13 can be disposed in a circular shape, and a plurality of connection sections 12b disposed to traverse a center of the annular rings 12a.

The annular rings 12a and the connection sections 12b may be configured as a single member, but in this embodiment, the annular rings 12a and the connection sections 12b are configured as a separate independent member respectively and configured to be fastened by the bolts, and the connection sections 12b are configured to have a shape in which a bearing insertion hole 12c penetrates through the center of the body formed in an approximately cross-shaped.

Also, a shaft column 16 is coupled to the bearing insertion hole 12c side of the lower support member 12' such that the load guide body 10 can be installed at sections to be installed (not illustrated, installation structure or installation place in which the multipurpose rotary device is installed). The shaft column 16 is configured such that a flange 16a is formed at an upper side of the body of a cylinder shape and is fastened and fixed to the connection sections 12b by the bolts, and an output shaft 22 of the rotor 20 is rotatably inserted and installed into the shaft column 16.

The load guide plates 13 serve as vertical members having a distance corresponding to a separated distance between the upper and lower support members 12 and 12', and are configured such that fluids flowing into spaces between the load guide plates 13 are not escaped to the outside and are guided toward the blades 21. To this end, as illustrated in FIG. 2c, the cross-sectional shape of the load guide plates 13 is formed of straight line sections 13a formed in a linear form from an outer circumferential edge of upper support member 12 and the lower support member 12' toward a center direction of the rotor 20 and diagonal sections 13b that are bent at ends of the straight line sections 13a in the rotational direction of the rotor 20 and are formed up to a place close to the outer circumferential edge of the blades 21.

In particular, the straight line sections 13a and the diagonal sections 13b of the load guide plates 13 are formed to have a slope in which the fluids passing between the neighboring diagonal sections 13b of the load guide plates 13 are guided to the outside portion (the edge portion of the blades located far away from the output shaft of the rotor).

Meanwhile, as illustrated in FIG. 2b and FIG. 2c, the rotor 20 includes the blades 21, the output shaft 22 that is formed in a bar structure and vertically disposed, a central cylinder 23 that is coupled to the output shaft 22 and formed in a cylinder shape, and circular rims 24 that are installed at the upper and lower sides of the central cylinder 23 via a plurality of rim supports 25 such that the blades 21 are fixed, and are rotatably installed at the load guide body 10 by a bearings 26 interposed between the upper and lower ends of the output shaft 22 and installed at the bearing insertion hole 12c of the upper support member 12 and the lower support member 12'.

The blades 21 are configured to generate a rotational force due to the loads of the fluids flowing via the load guide plates 13, and may be selected from between drag type blades (see FIG. 20 configured to rotate due to a drag generated to the blades such as a paddle type or a savonius type or lift force type blades (see FIG. 2d) configured to rotate due to a lift force generated to the blades such as a darrieus type or a gyromill type, or may use the combination of the drag type blades and the lift force type blades. However, in this embodiment, the blades 21 are configured such that the lift force type blades with excellent aerodynamic characteristics at a tip speed ratio of 1 or more are used.

For example, as illustrated in FIG. 2c, the lift force type blade is configured as an airfoil type blade that is a representative form. As known in the related art, an airfoil type blade have a cross-section with a streamlined shape structure, and trailing edge portions a are inserted and coupled into the circular rims 24 and leading edge portions b are installed to be located in a circumferential direction of the rotor 20.

Also, the airfoil type blade has an insertion groove 21a that is concaved vertically at the trailing edge portions thereof to be inserted into the circular rims 24, and is fixed to the circular rims 24 by the bolts fastened to a fixing bracket 21b, as the fixing bracket 21b is protruded to be in contact with the insertion groove 21a.

Meanwhile, as illustrated in FIG. 2e, the lift force type blades may be configured as an airfoil type blade having a cutout portion c formed in an inward surface. In the airfoil type blade having the cutout portion formed therein, as the cutout portion c is formed in the inward surface, the drag is exerted to one side of the inward surface by the fluids, in addition to the lift force. As such, there is an advantage to generate the rotational moment at a flow region with low speed having the tip speed ratio (an airfoil end speed/a wind speed of the blades) of 1 or less by the drag.

The action of the multipurpose rotary device according to the first embodiment of the present invention as mentioned above will be briefly described.

In the multipurpose rotary device 1R according to the first embodiment of the present invention, the load guide plates 13 used to guide substantially the loads of the fluids toward the blades 21 are formed throughout the entire circumference of the rotor 20, and an shape in which the loads of the fluids can be effectively guided in the rotor is provided. Thus, even when the loads of the fluids are exerted from all directions, the high rotational force can be obtained.

As illustrated in FIG. 2c, as the cross-sectional structure of the load guide plates 13 include the straight line sections 13a formed in a linear form toward the center direction, and diagonal sections 13b that are bent at the end of the straight line sections 13a and are formed up to the place close to the outer circumferential edge of the blades 21, the fluids flowing into spaces between the load guide plates 13 are not escaped to the outside and are guided toward the blades 21. As such, there is an advantage to obtain the relatively large rotational force relative to the limited loads of the fluids.

In the load guide body 10 according to this embodiment, as illustrated in FIG. 2d to FIG. 2f, since the loads are effectively guided in the wide range A1, the loads are simultaneously exerted to the plurality of blades. As a result, the very large rotational force is obtained from the output shaft 22 of the rotor 20.

Figure 2G:
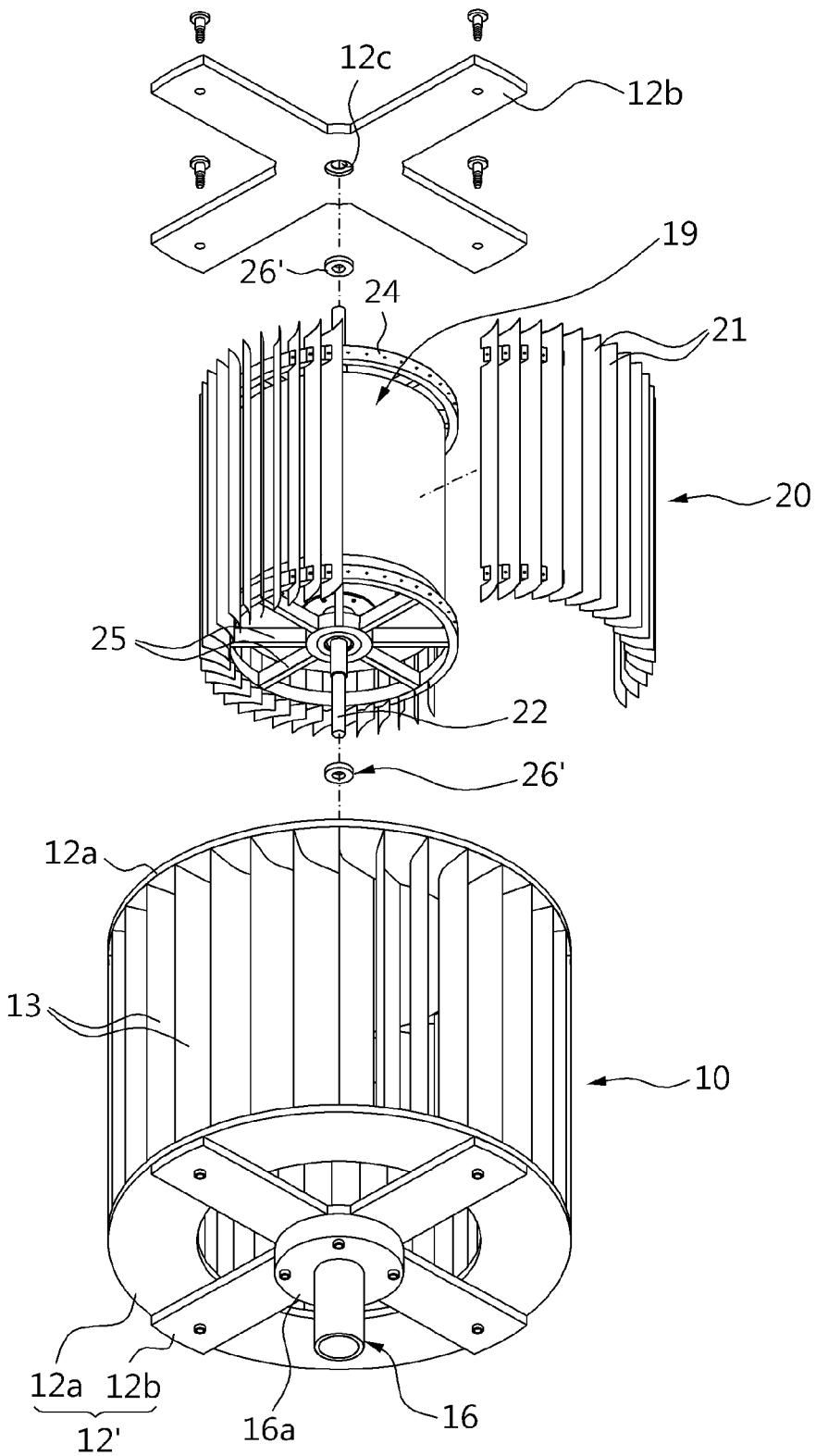
FIG. 2g is an exploded perspective view illustrating a modified example of the multipurpose rotary device according to the first embodiment of the present invention.
Figure 2H:
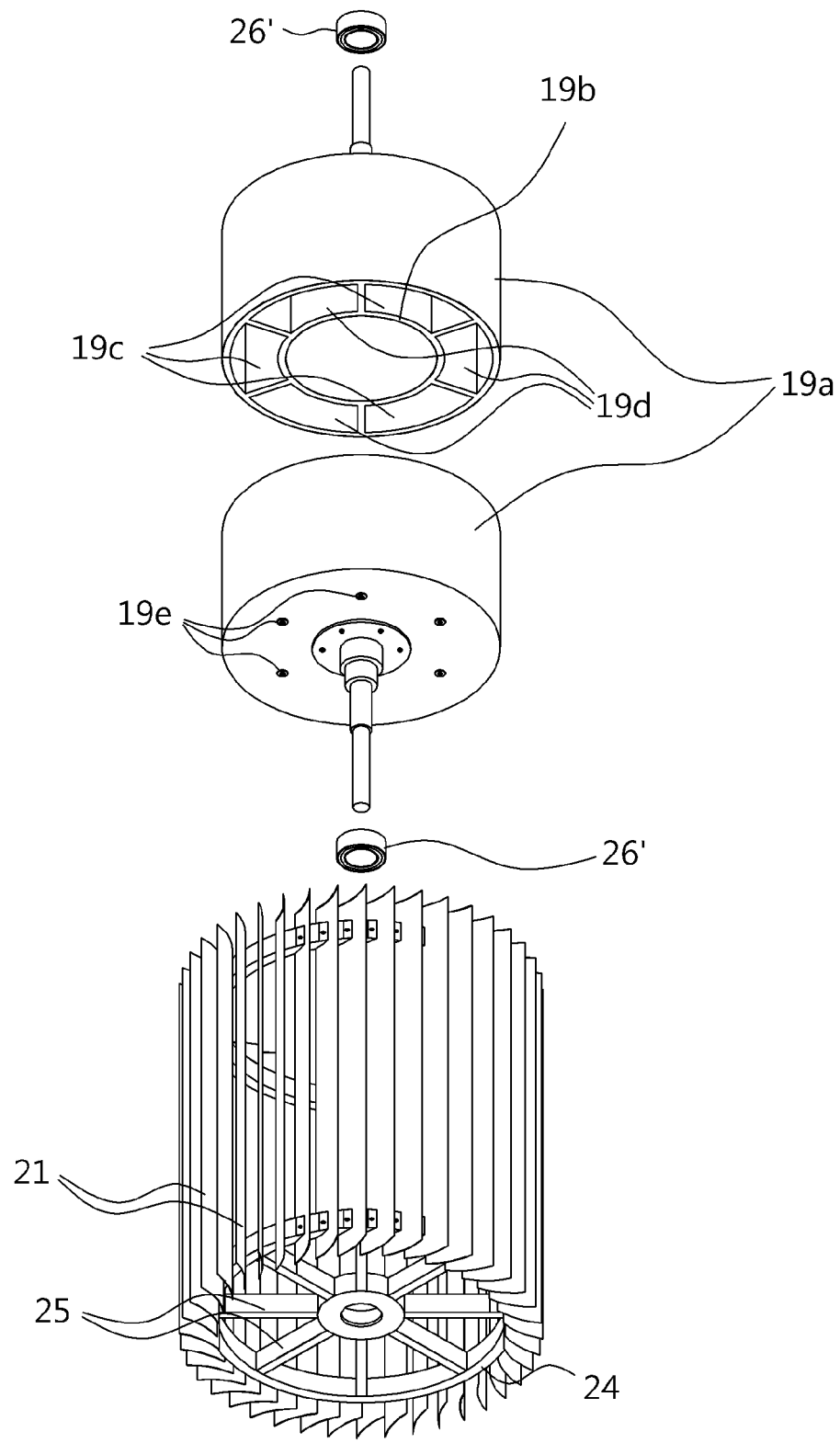
FIG. 2h is a cutout exploded perspective view illustrating a major part for describing the modified example of the multipurpose rotary device according to the first embodiment of the present invention.

FIG. 2g is an exploded perspective view illustrating a modified example of the multipurpose rotary device according to the first embodiment of the present invention, FIG. 2h is a cutout exploded perspective view illustrating a major part for describing the modified example of the multipurpose rotary device according to the first embodiment of the present invention.

Referring to FIG. 2g and FIG. 2h, the multipurpose rotary device according to the modified example includes the load guide body 10 and the rotor 20, and load and weight adjustment means 19 configured such that the weight of the multipurpose rotary device may be adjusted while the loads of the fluids exerted to the rotor 20 are evenly smoothed as an unidirectional rotational force.

The load and weight adjustment means 19 includes a load and weight adjustment body 19a having the output shaft 22 formed at the upper and lower sides thereof, and an unidirectional bearings 26' inserted and installed at the upper and lower sides of the output shaft 22 and having the structure rotatable only in one direction.

As illustrated in FIG. 2h, the load and weight adjustment body 19a is formed in the rotor 20, are classified into flywheel spaces 19c that are defined by a partition 19b protruded to a central space of the cylindrical body and performing compartment and are configured to receive the fluids, and buoyancy spaces 19d configured to adjust the buoyancy. In each of the flywheel spaces 19c and the buoyancy spaces 19d, in order to adjust an injection amount of the fluids, an adjustment hole 19e is formed.

When the action of the above-mentioned load and weight adjustment means 19 will be briefly described, as illustrated in FIG. 2g and FIG. 2h, in the case in which the loads such as uneven wave power flow through the load guide body 10 and applied to the blades 21, there is an advantage in which the loads are exerted by the unidirectional bearings 26' only in one direction, the rotational force are evenly smoothed due to an fly-wheel effect obtained owing to the weight of water filled in the flywheel spaces 19c of the load and weight adjustment body 19a, and the weight of the rotor 20 is lightened using the buoyancy spaces 19d filled with a light gas such as air in order to cause a buoyancy to increase efficiency of the rotation in water.

BEST FOR CARRYING OUT THE PRESENT INVENTION

Figure 3A:
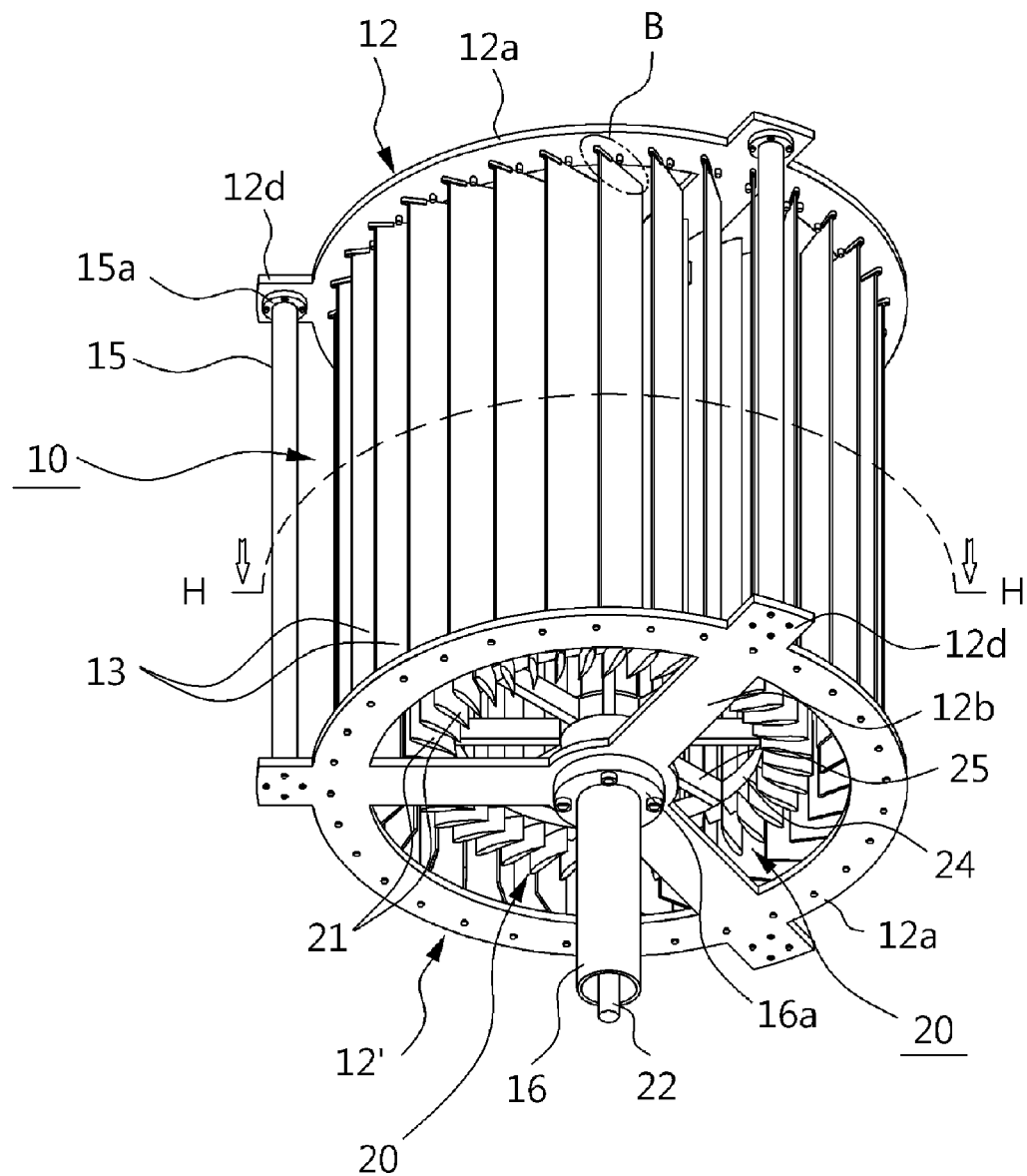
FIG. 3a is a perspective view illustrating a schematic configuration of a multipurpose rotary device according to a second embodiment of the present invention.
Figure 3B:
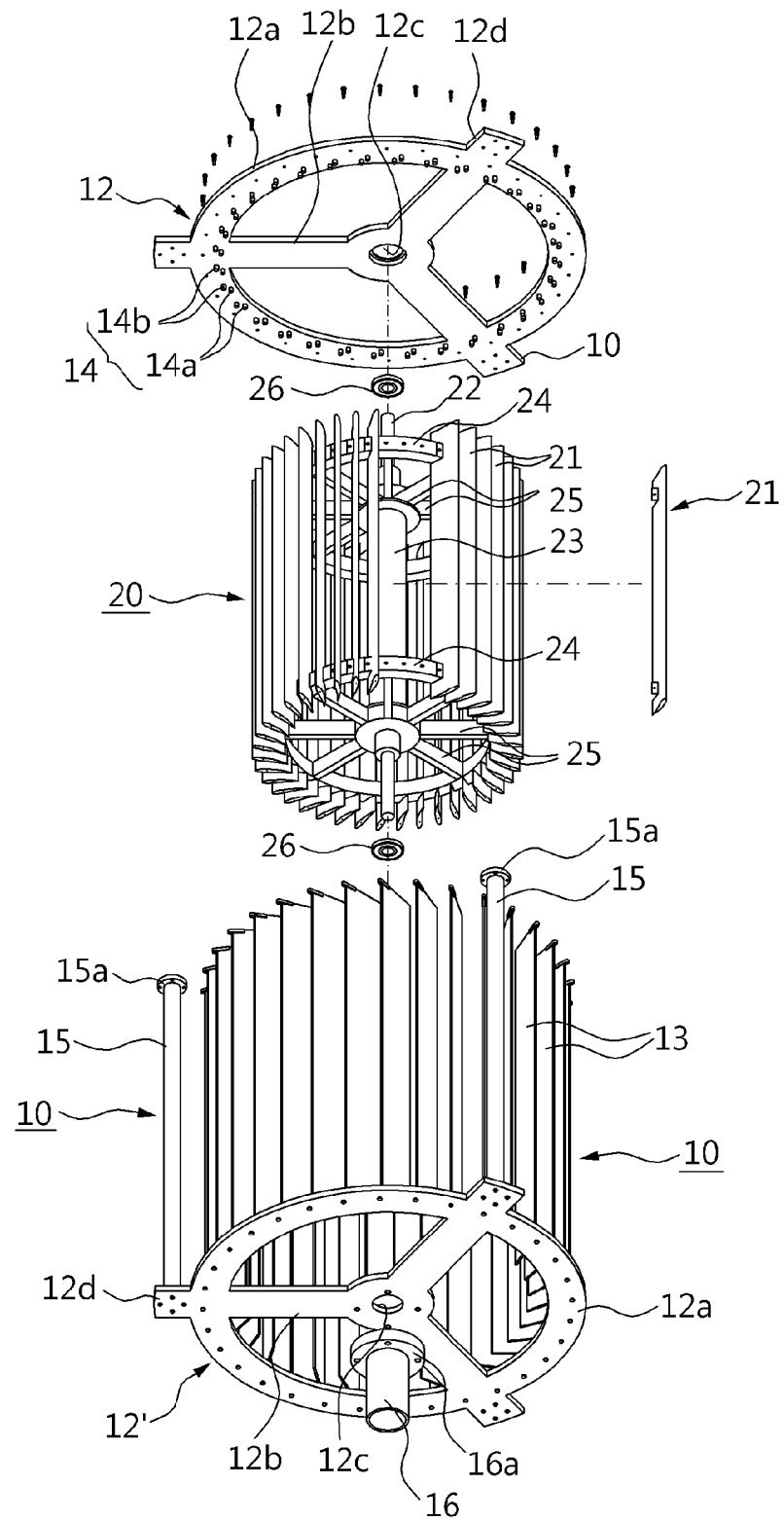
FIG. 3b is an exploded perspective view illustrating the schematic configuration of the multipurpose rotary device according to the second embodiment of the present invention.
Figure 3C:
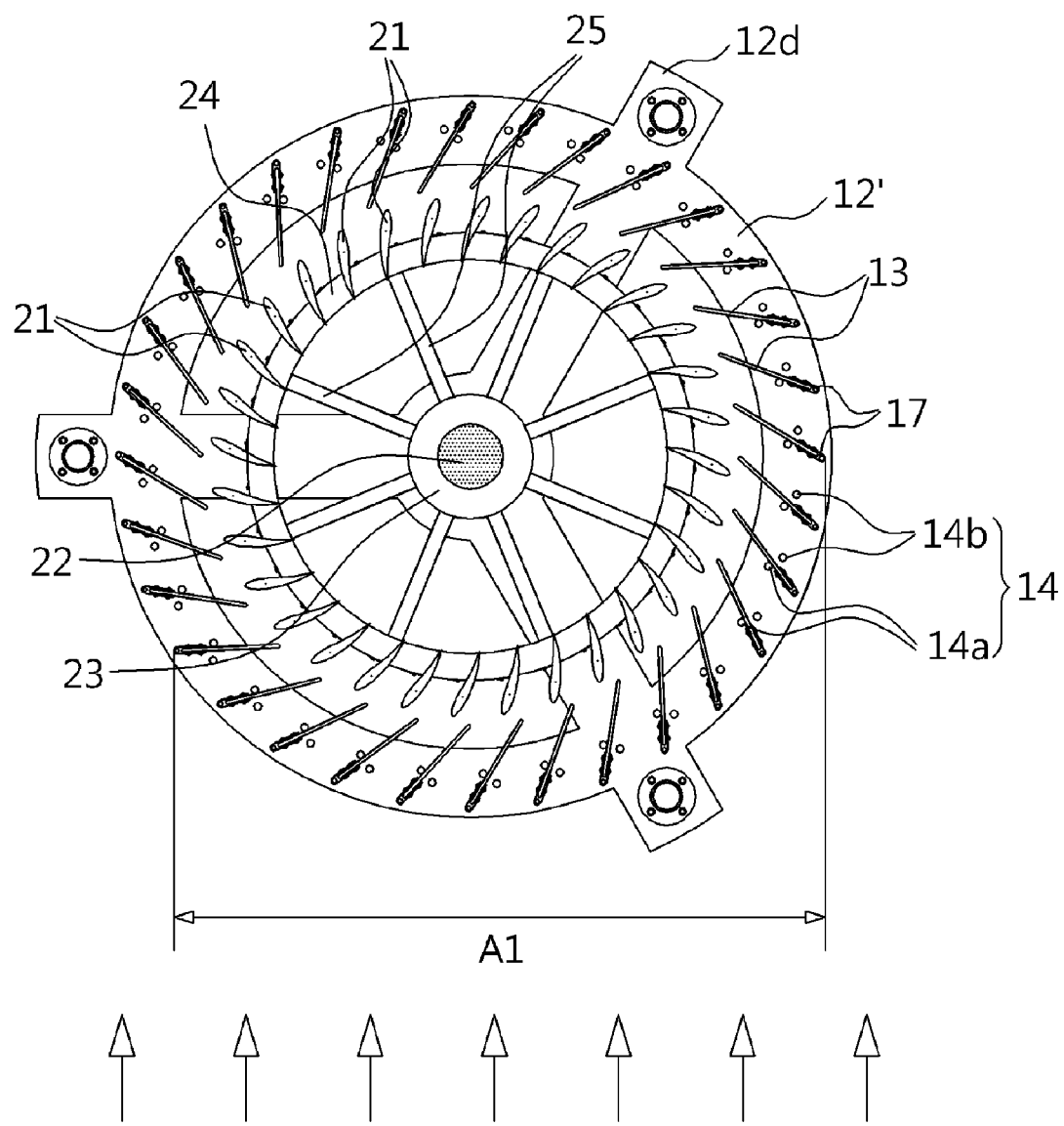
Figure 3D:
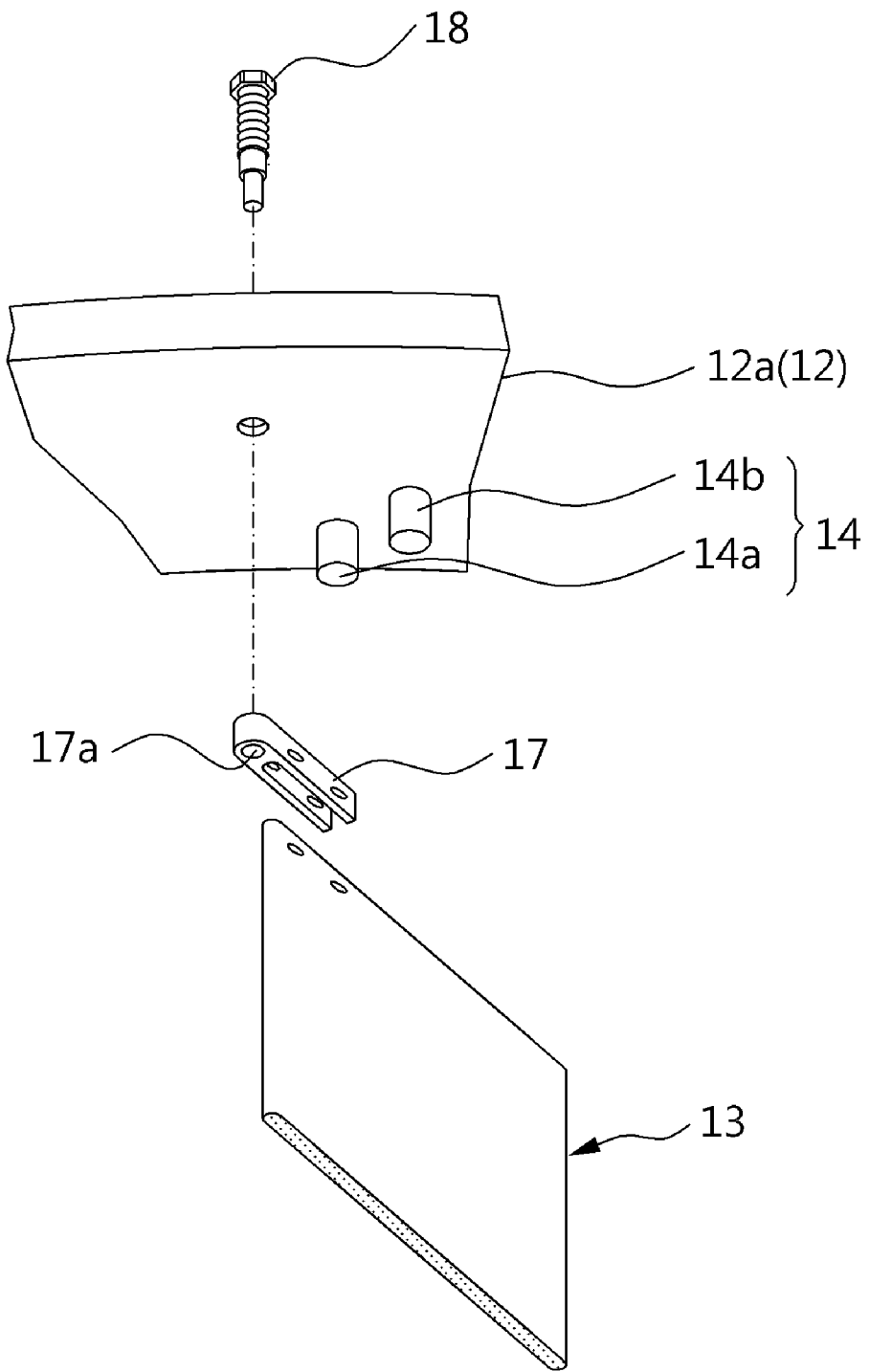
Figure 3E:
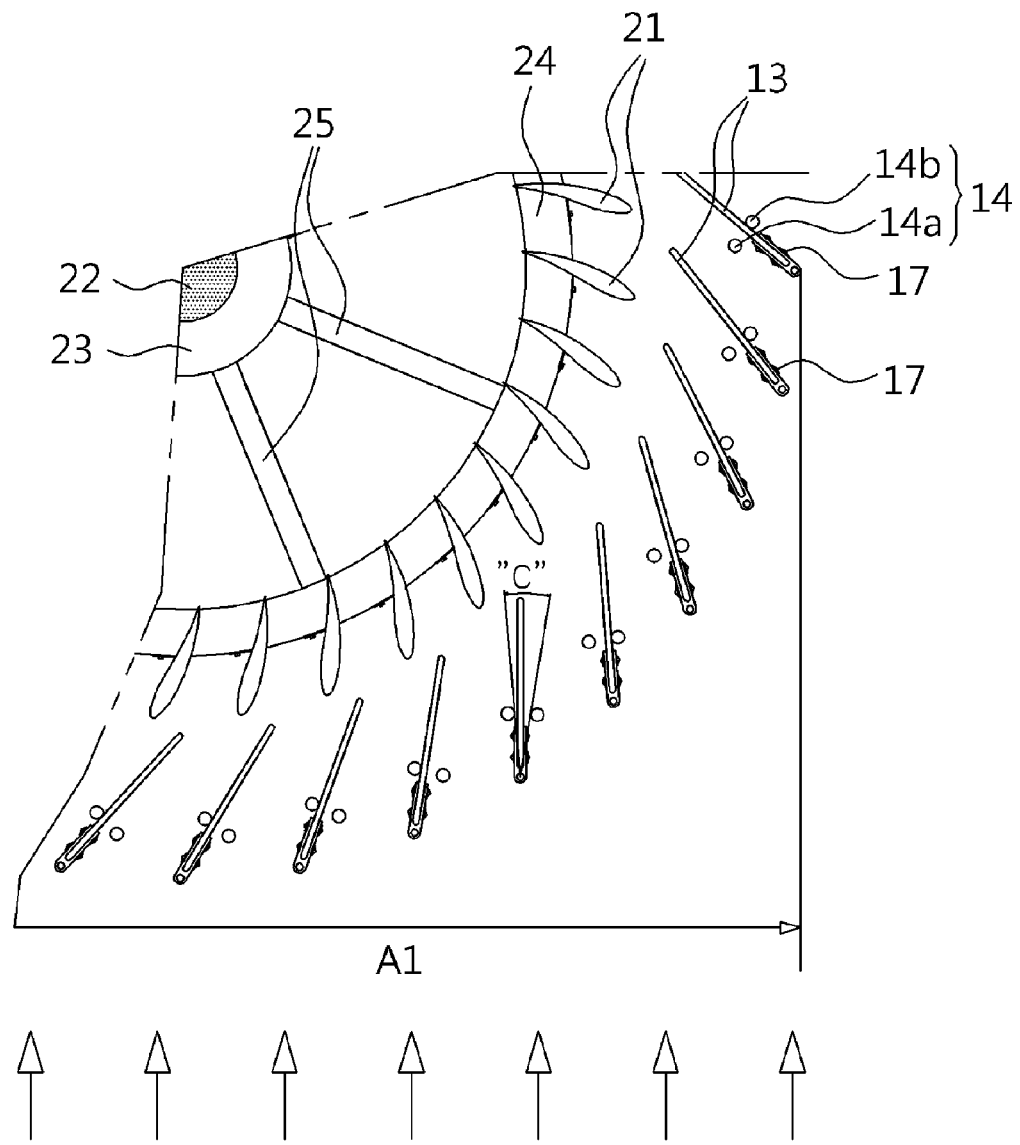
FIG. 3e is an enlarged plane cross-sectional view illustrating a major part for describing an action of the multipurpose rotary device according to the second embodiment of the present invention.
Figure 3F:
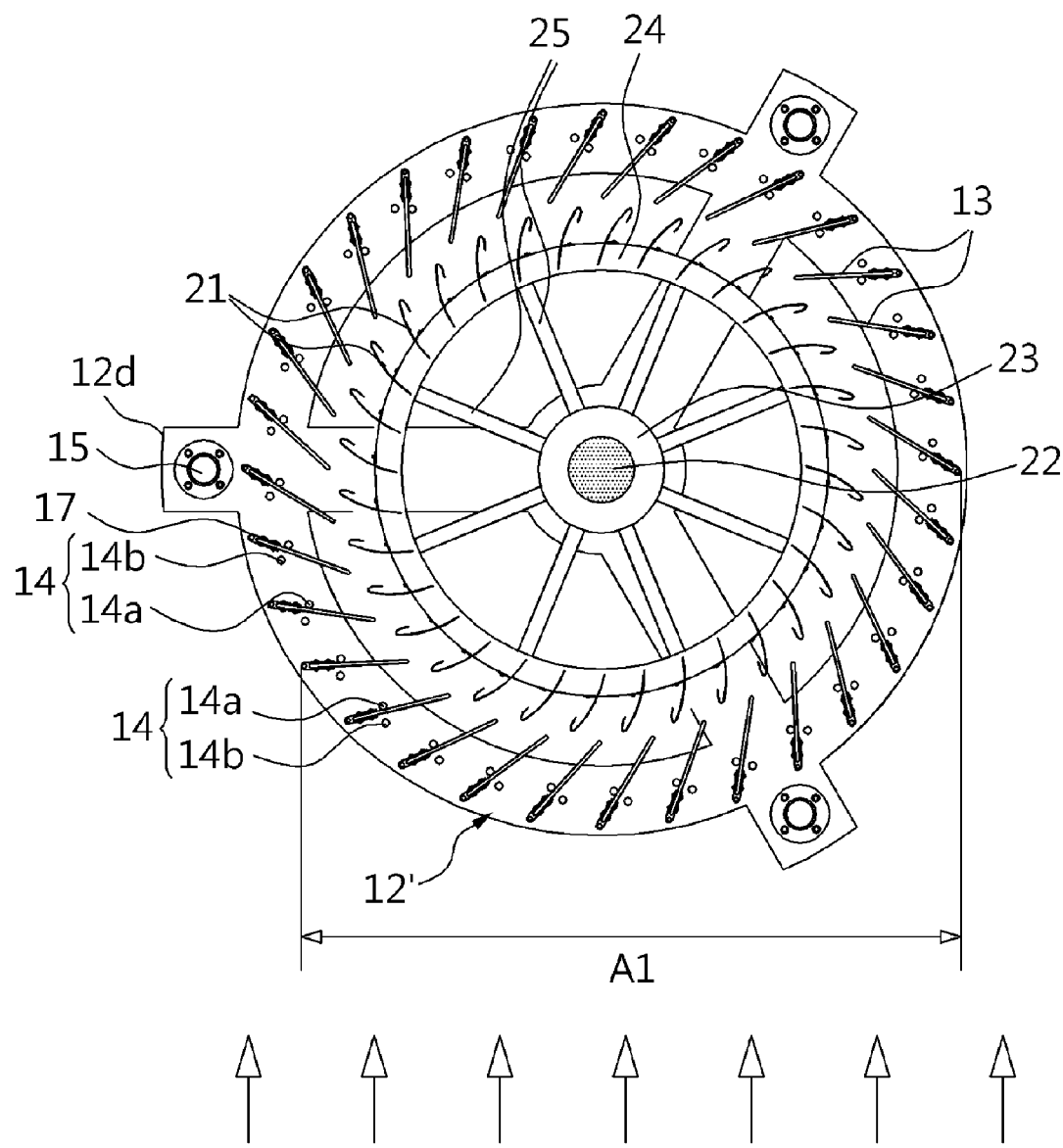
FIG. 3f is a cross-sectional view taken along line H-H of FIG. 3a for describing a modified example of the multipurpose rotary device according to the second embodiment of the present invention.

FIG. 3a is a perspective view illustrating a schematic configuration of a multipurpose rotary device according to a second embodiment of the present invention. FIG. 3b is an exploded perspective view illustrating the schematic configuration of the multipurpose rotary device according to the second embodiment of the present invention. FIG. 3c is a cross-sectional view taken along line H-H of FIG. 3a. FIG. 3d is an enlarged and exploded perspective view of a portion B in FIG. 3a, FIG. 3e is an enlarged plane cross-sectional view illustrating a major part for describing an action of the multipurpose rotary device according to the second embodiment of the present invention, and FIG. 3f is a cross-sectional view taken along line H-H of FIG. 3a for describing a modified example of the multipurpose rotary device according to the second embodiment of the present invention.

Referring to FIG. 3a to FIG. 3e, the multipurpose rotary device 1R according to the second embodiment of the present invention includes the load guide body 10 and the rotor 20, and includes the upper support member 12 and the lower support member 12' in which the load guide body 10 is disposed to face and connected to each other at the upper and lower sides such that the rotor is rotatably installed, the plurality of load guide plates 13 rotatably installed in a longitudinal direction between the upper and lower support members 12 and 12' to correspond to the blades 21 of the rotor 20, and the stop pins 14 formed in the facing inner side of the upper and lower support members 12 and 12' and configured to control the rotational angle of the load guide plates 13.

Since the upper support member 12 and the lower support member 12' are coupled to correspond to each other, the upper support member 12 and the lower support member 12' are formed in the same or similar form and include the annular rings 12a formed with the stop pins 14, the plurality of connection sections 12b disposed to traverse the center of the annular rings 12a, and the bearing insertion hole 12c formed to penetrate through the centers of the connection sections 12b.

The upper support member 12 and the lower support member 12' are fixed each other by the plurality of support columns 15 installed in the longitudinal direction, and the support columns 15 may be formed in various forms. However, in this embodiment, the upper support member 12 and the lower support member 12' have a structure in which the flanges 15a are formed at the upper and lower ends of the rod-shaped pillar and configured to be coupled to support portions 12d protruded to the outside thereof in the annular rings 12a.

The shaft column 16 is coupled to the bearing insertion hole 12c of the side of the lower support member 12' such that the load guide body 10 is installed at the sections to be installed. The shaft column 16 has the flanges 16a formed at the upper side of the cylinder body thereof, is fastened and fixed to the connection sections 12b, and has the output shaft 22 of the rotor 20 rotatably inserted and installed therein.

Meanwhile, as illustrated in FIG. 3c and FIG. 3d, the load guide plates 13 have a configuration in which the loads of the flowing fluids are substantially guided toward the blades 21, and are rotatably installed by the space between the stop pins 14, by a guide plate rotary shaft bolt 18 that is fastened to the upper and lower support members 12 and 12'. The guide plate hinge members 17 having a hinge shaft insertion hole 17a are configured to be coupled to the upper and lower ends of the load guide plates 13 by fastening members such as bolts, and the lower part of the guide plate rotary shaft bolt 18 is configured to be inserted into the hinge shaft insertion hole 17a of the guide plate hinge members 17.

The stop pins 14 have a configuration in which the rotational space is formed such that the load guide plates 13 are rotated within a predetermined range, and are configured to be equally distributed in a ring shape into the number corresponding to the load guide plates. The stop pins 14 are disposed such that inside stop pins 14a and outside stop pins 14b are paired for each of load guide plates 13. In this case, as illustrated in FIG. 3e, the formation positions of the inside stop pins 14a and the outside stop pins 14b are located at the inner and outer sides of the annular rings 12a, respectively. It is preferable that the rotational angle of the load guide plates 13 be formed in the range of angle C up to a place close to the leading edge approximately at a center of a chord (line of connecting the leading edge to the trailing edge) in the range of angle in which the loads of the fluids generate the relatively large rotational force.

Meanwhile, the rotor 20 includes the blades 21, the output shaft 22 formed in a bar structure and vertically disposed, a central cylinder 23 coupled to the output shaft 22 and formed in a cylinder shape, and the circular rims 24 installed at the upper and lower sides of the central cylinder 23 via the plurality of rim supports 25 to fix the blades 21, and rotatably installed at the load guide body 10 by the bearings 26 inserted to the upper and lower ends of the output shaft 22 and installed at the bearing insertion hole 12c of the upper support member 12 and the lower support member 12'.

The blades 21 have the configuration in which the rotational force is generated due to the loads of the fluids flowing through the load guide plates 13. As described in the above-mentioned first embodiment, the blades 21 are selected from the drag type blades or the lift force type blades, or are used as a combination of the drag type blades and the lift force type blades. However, in this embodiment, the blades 21 are configured such that the lift force type blades with excellent aerodynamic characteristics at a tip speed ratio of 1 or more are used.

The action of the multipurpose rotary device according to the second embodiment of the present invention as described above will be briefly described.

In the multipurpose rotary device according to the second embodiment of the present invention, the load guide plates 13 used to guide substantially the loads of the fluids toward the blades 21 are rotatably formed. Thus, even when the loads of the fluids are exerted from all directions, the rotational force can be effectively obtained. In addition, as illustrated in FIG. 3e, since the load guide plates 13 are rotated a space between the inside stop pins 14a and the outside stop pins 14b that is defined in the range of angle C that generates the large rotational force, there is an advantage in which the relatively large rotational force can be obtained relative to the predetermined loads of the fluids.

As illustrated in FIG. 3c and FIG. 3d, since the load guide plates 13 are rotated in the range of angle C that generates the large rotational force and the loads are effectively guided in the wide range A1, the loads can be simultaneously exerted to the plurality of blades and obtain the very large rotational force from the output shaft 22.

Figure 4A:
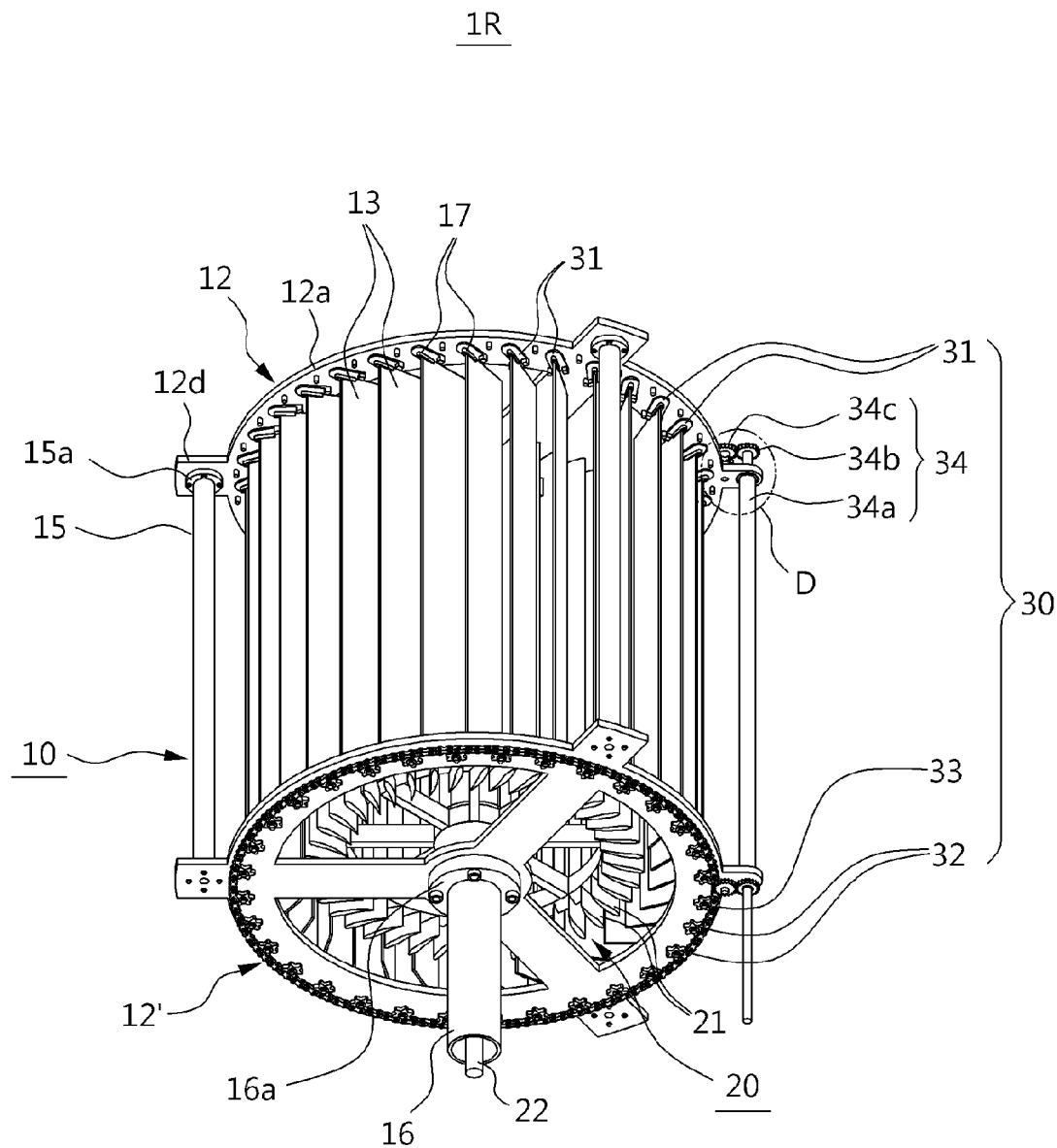
FIG. 4a is a perspective view illustrating a multipurpose rotary device according to a third embodiment of the present invention.
Figure 4B:
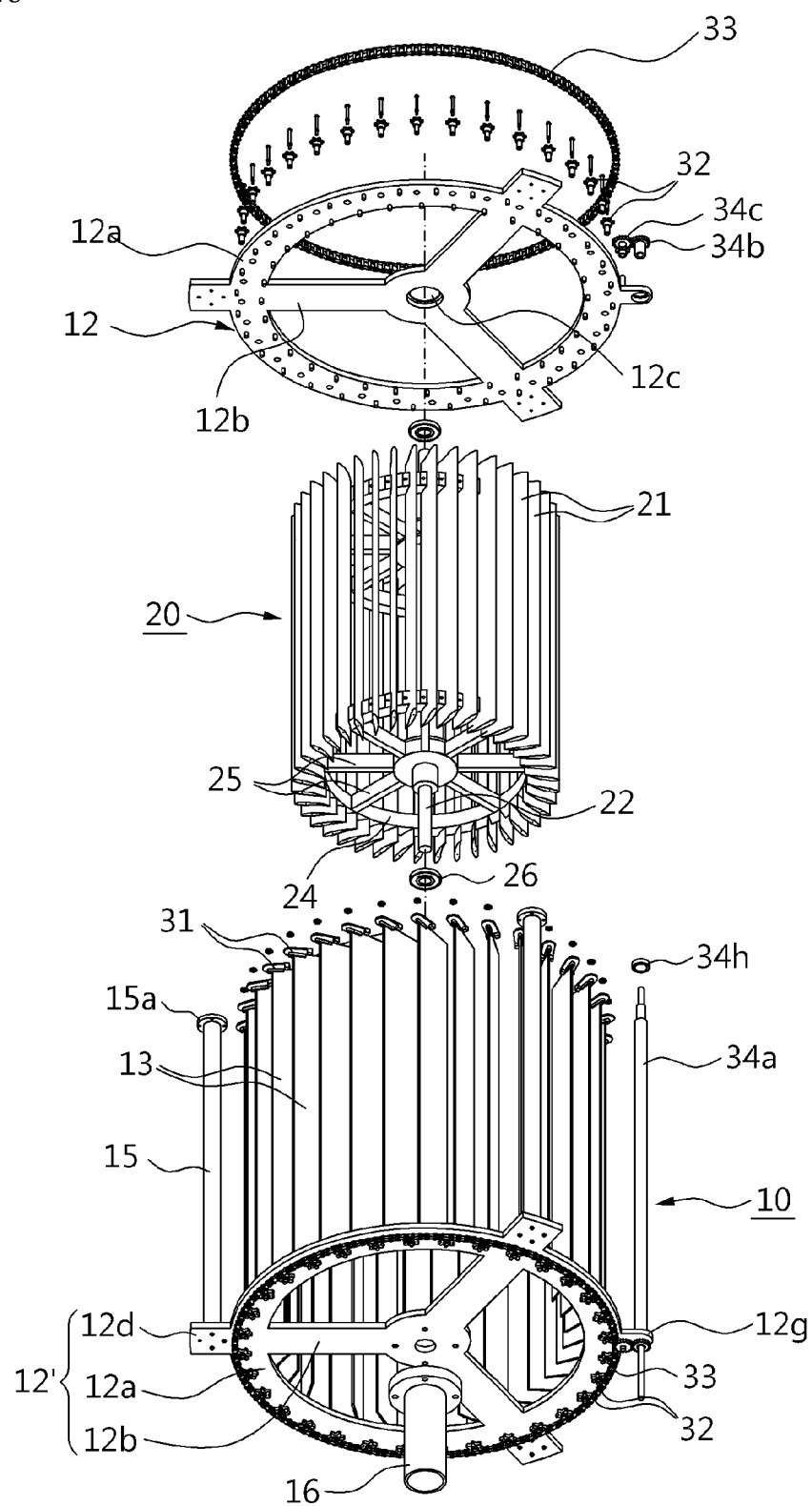
FIG. 4b is an exploded perspective view illustrating the multipurpose rotary device according to the third embodiment of the present invention.
Figure 4C:
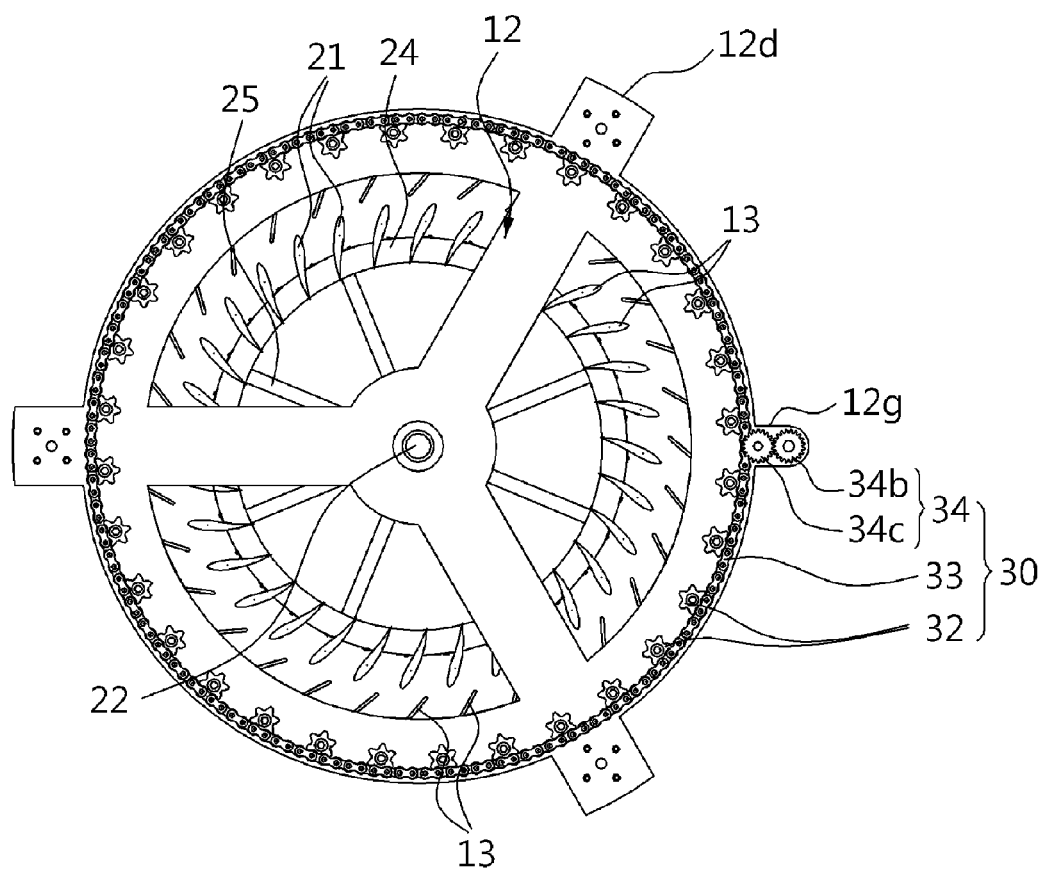
FIG. 4c is a plane cross-sectional view illustrating the multipurpose rotary device according to the third embodiment of the present invention.
Figure 4D:
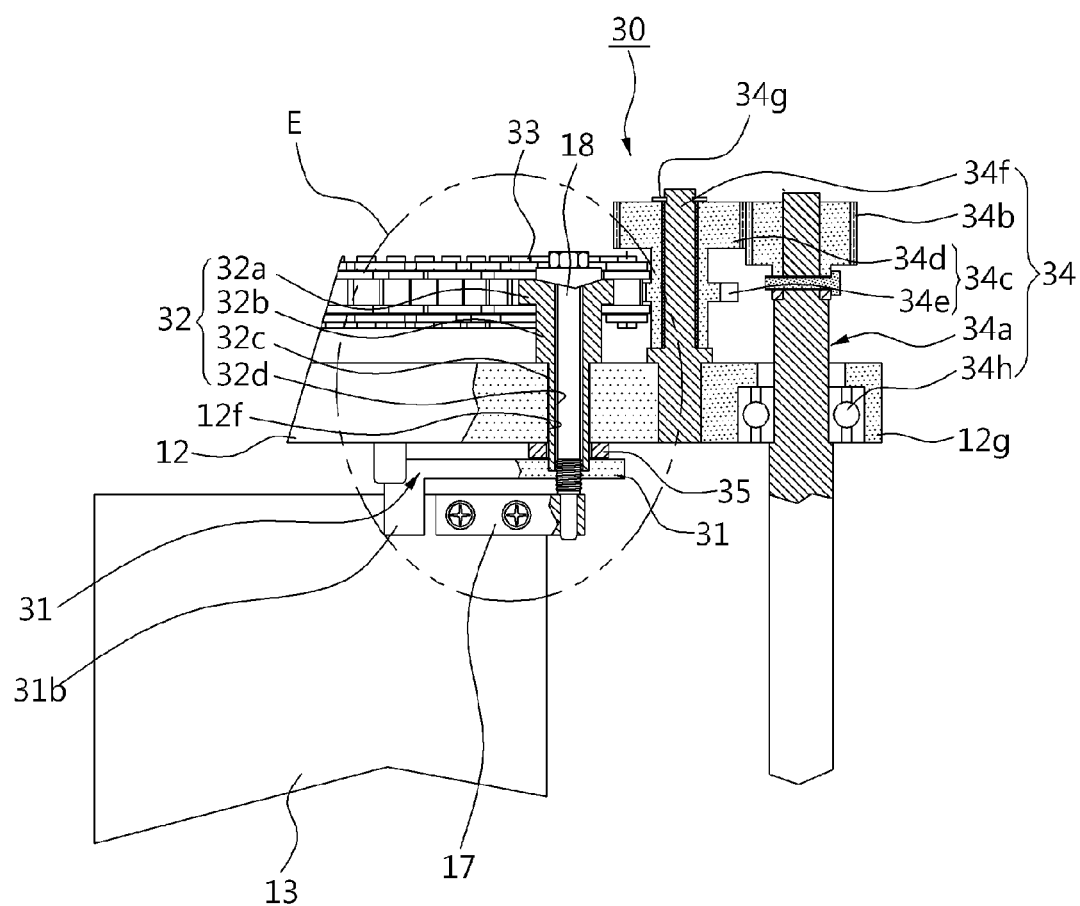
Figure 4E:
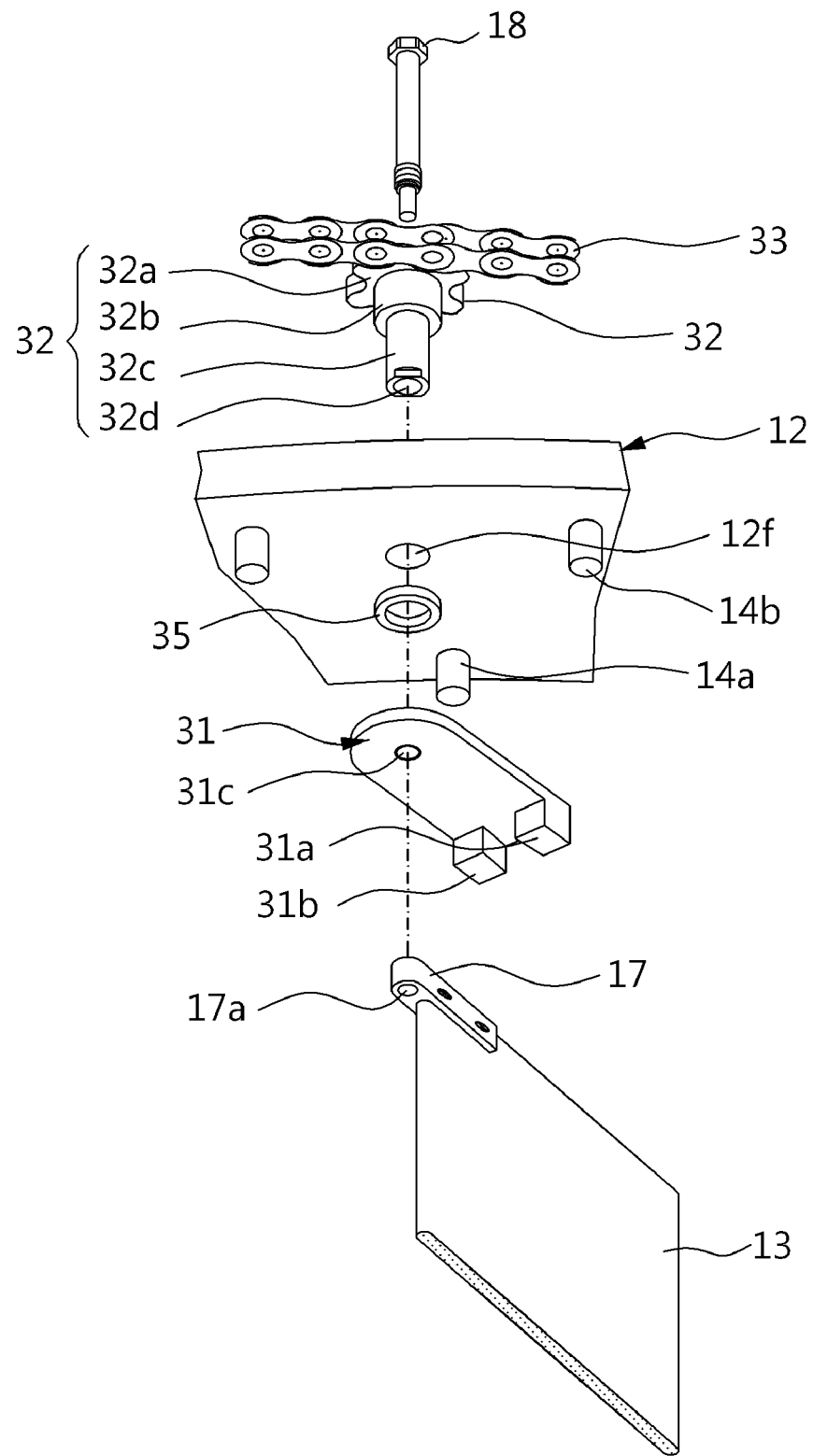
FIG. 4e is an exploded perspective view of a portion E in FIG. 4d.
Figure 4F:
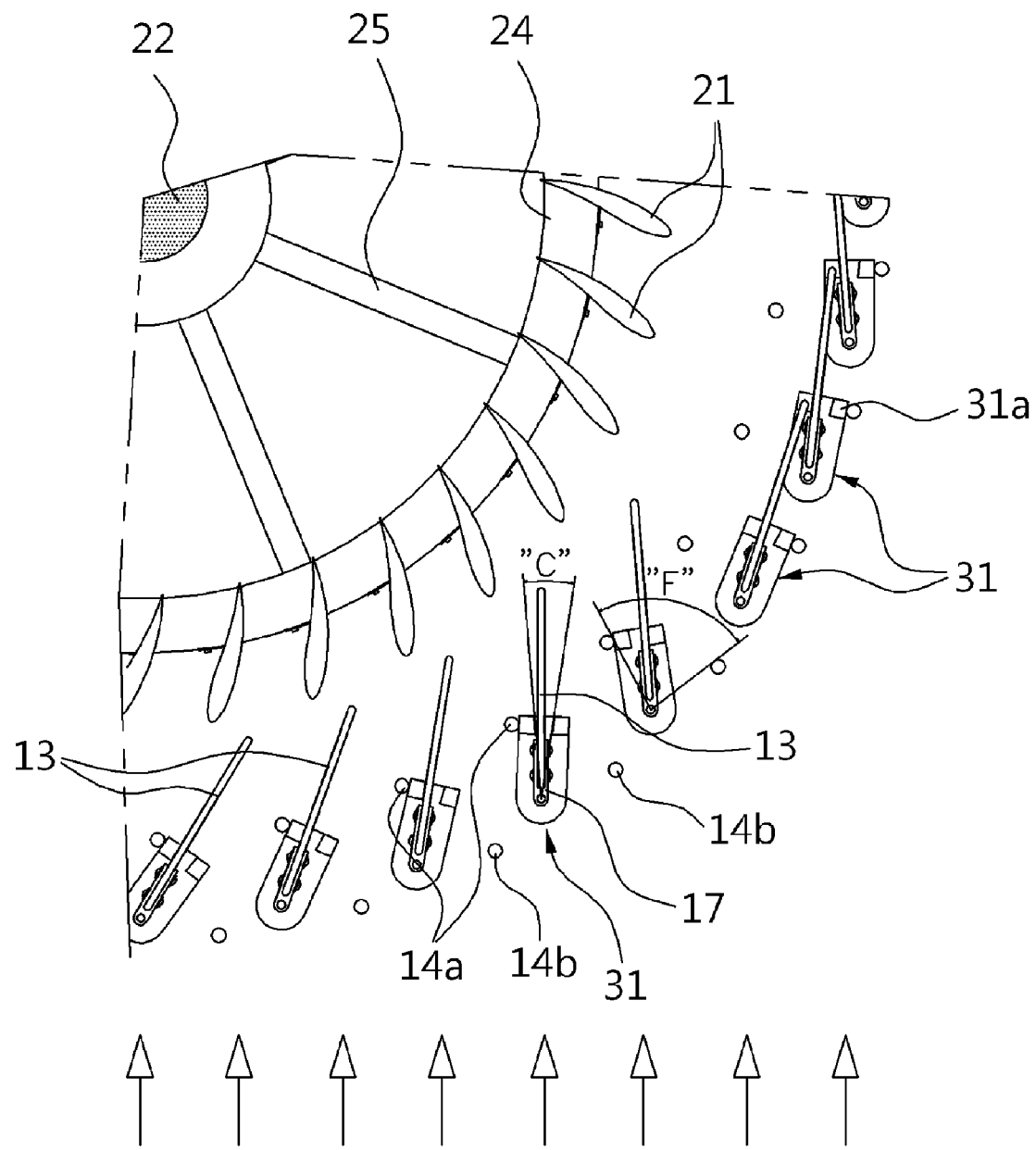
FIG. 4f and FIG. 4g are an enlarged view of a major part and a plane cross-sectional view illustrating an action of the multipurpose rotary device according to the third embodiment of the present invention.
Figure 4G:
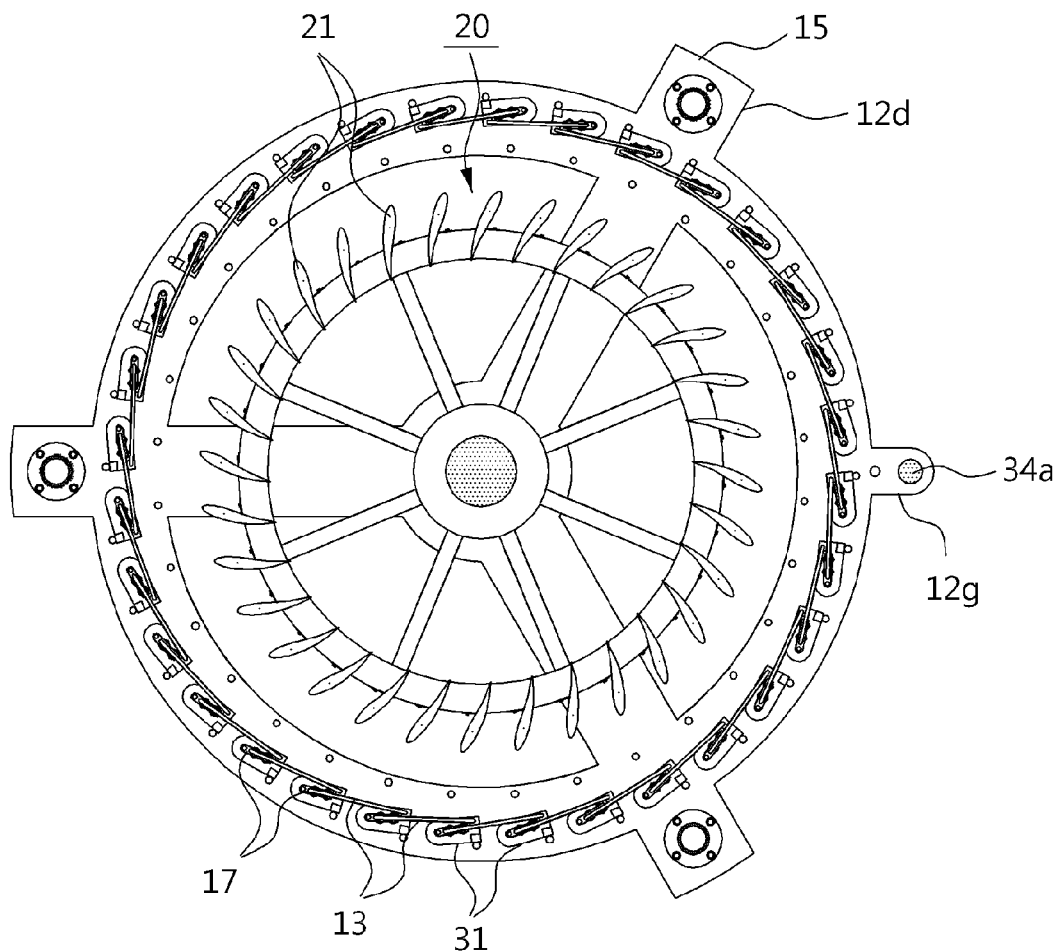

FIG. 4a is a perspective view illustrating a multipurpose rotary device according to a third embodiment of the present invention, FIG. 4b is an exploded perspective view illustrating the multipurpose rotary device according to the third embodiment of the present invention, FIG. 4c is a plane cross-sectional view illustrating the multipurpose rotary device according to the third embodiment of the present invention, FIG. 4d is an enlarged cross-sectional view of a portion D in FIG. 4a, FIG. 4e is an exploded perspective view of a portion E in FIG. 4d, and FIG. 4f and FIG. 4g are an enlarged view of a major part and a plane cross-sectional view illustrating an action of the multipurpose rotary device according to the third embodiment of the present invention.

Referring to FIG. 4a to FIG. 4g, the multipurpose rotary device 1R according to the third embodiment of the present invention includes load guide body 10 and a rotor 20, and further includes load adjustment opening and closing means 30 configured to adjust a loading amount of fluids guided to the load guide body 10 by the rotor 20 or block the loads of the guided fluids.

The load adjustment opening and closing means 30 includes a pair of fastening pieces 31a and 31b such that a rotation space in which the upper and lower sides of the load guide plates 13 are inserted and rotated is defined, and includes a plurality of rotational members 31 rotatably installed between inside and outside stop pins 14a and 14b, rotational chain gears 32 connected to the load guide plates 13 and the rotational members 31, a rotational chain 33 configured to rotate the rotational chain gears 32, and an opening and closing means driving unit 34 configured to transmit power to rotate the rotational chain 33.

The opening and closing means driving unit 34 includes a load opening and closing shaft 34a configured to receive an external power, a driving super gear 34b coupled to the upper and lower ends of the load opening and closing shaft 34a, and an auxiliary gear 34c that has a super gear 34d meshed with the driving super gear 34b and a chain gear 34e engaged with a side of the rotational chain 33 which are formed as one body, and is rotatably installed at the upper and lower support members 12 and 12'. In this case, as illustrated in FIG. 4d, the auxiliary gear 34c is rotatably connected in a state in which a shaft 34f is inserted into the center rotation hole and is fixed by a stop ring 34g.

Hereinafter, a coupled relationship between the load adjustment opening and closing means 30, and the load guide body 10 and the rotor 20 will be described in more detail. The load guide body 10 and the rotor 20 included in the multipurpose rotary device according to the third embodiment of the present invention have the same structure as or a similar structure to those of the above-mentioned second embodiment, except for some elements. As such, only different portions will be described in detail, but the detailed description of the same portion as or a similar portion to that of the second embodiment will be omitted and the same or similar portion is denoted by the same reference numerals.

As illustrated in FIG. 4e and FIG. 4f, the upper support member 12 and the lower support member 12' are configured such that chain gear rotation holes 12f and the inside and outside stop pins 14a and 14b are equally distributed in a circular shape toward the outer circumference of the annular ring 12a along the peripheral of the inner side of the annular rings 12a. In addition, as illustrated in FIG. 4b, a bearing housing inserted by a bearing 34h is formed in another protrusion 12g protruded toward the outer circumference of the annular ring 12a. The load opening and closing shaft 34a is coupled to the inner hole of the bearing 34h rotatably coupled to the protrusion 12g. The load opening and closing shaft 34a is rotatably coupled to the inner hole of the bearing 34h coupled to the protrusion 12g.

As illustrated in FIG. 4e, the rotational members 31 are disposed between the inside and outside stop pins 14a and 14b, and the fastening pieces 31a and 31b are formed to have the same interval as the space between the stop pins 14a and 14b described in the second embodiment. In addition, the load guide plate 13 having the guide plate hinge members 17 attached thereon is inserted between the fastening pieces 31a and 31b.

The rotational chain gear 32 includes a chain gear portion 32a, a space formation step portion 32b, and a shaft portion 32c sequentially from the upper side of a member of a round bar shape, and has a bolt insertion hole 32d, into which the guide plate rotary shaft bolt 18 is inserted, penetrated therethrough. The lower part of the shaft portion 32c is fastened to be fixed to a tap hole 31c of the rotational member 31. The lower part of the guide plate rotary shaft bolt 18 that is inserted to the bolt insertion hole 32d of the rotational chain gear 32 is inserted to the hinge shaft insertion hole 17a of the guide plate hinge member 17. In this case, a washer 35 is interposed between the rotational member 31 and the lower support member 12 and 12'.

The action of the multipurpose rotary device according to the third embodiment of the present invention as mentioned above will be briefly described.

As described above, in the multipurpose rotary device according to the third embodiment of the present invention, when the load guide plates 13 are assembled to the rotational members 31 and the rotational chain gears 32, as illustrated in FIG. 4f, since the load guide plates 13 are rotatable in the range of angle C that generates the large rotational force between the fastening pieces 31a and 31b, the very large rotational force can be obtained from the output shaft 22 of the rotor 20.

In particular, in the multipurpose rotary device according to the third embodiment of the present invention, the rotational members 31 are configured to be interlocked upon rotation of the rotational chain gears 32 to be rotatable within a rotation interval F between the inside and outside stop pins 14a and 14b. Therefore, when the load opening and closing shaft 34a is rotated in forward and reverse rotation directions as necessary, since the rotational force is transmitted in the order of a driving super gear 34b, an auxiliary gear 34c, and a rotational chain 33, and the rotational chain gears 32 are subjected to the forward and reverse rotations, the load guide plates 13 mounted the rotational members 31 are also rotated and the spaces between the load guide plates 13 that are a inflow path of the fluids are opened or closed.

As a result, when an excessive external force such as a typhoon is caused or a troubleshooting is required, as the load adjustment opening and closing means 30 is operated as necessary to perform opening and closing operations of the load guide plates 13, the action may be performed such that the external loads are transmitted to the rotor 20 or blocked.

Figure 5A:
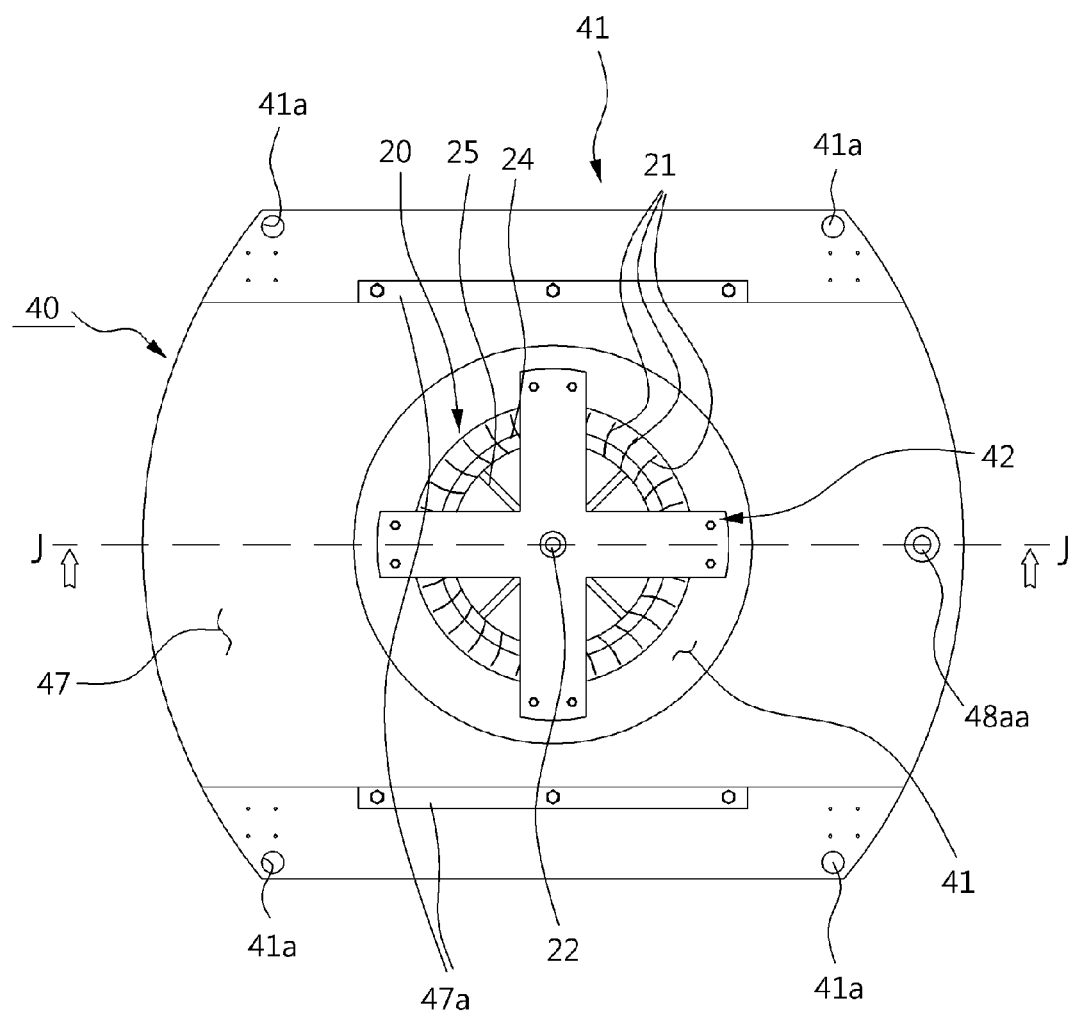
FIG. 5a is a schematic plan view illustrating a multipurpose rotary device according to a fourth embodiment of the present invention.
Figure 5B:
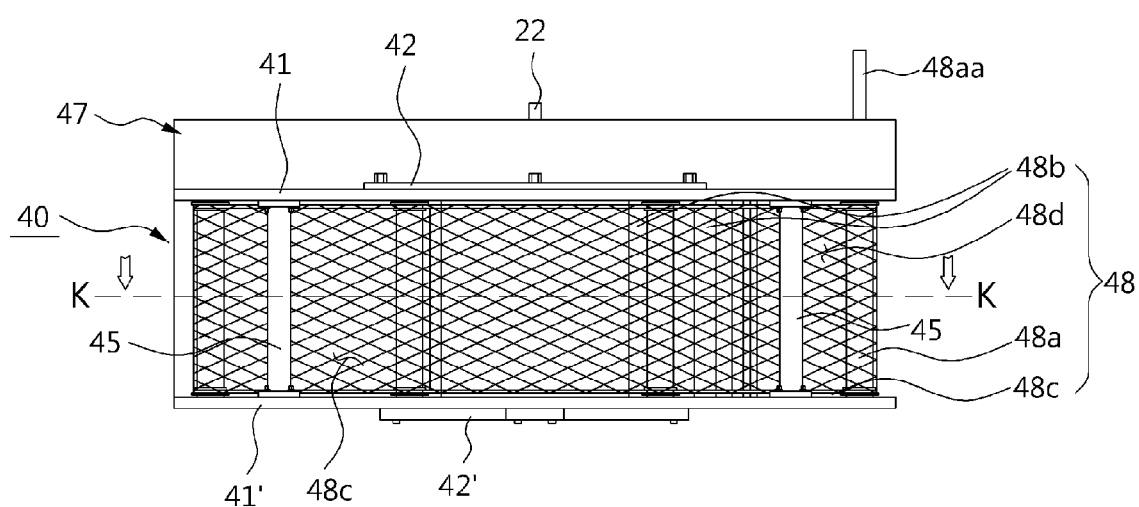
FIG. 5b is a schematic side view illustrating the multipurpose rotary device according to the fourth embodiment of the present invention.
Figure 5C:
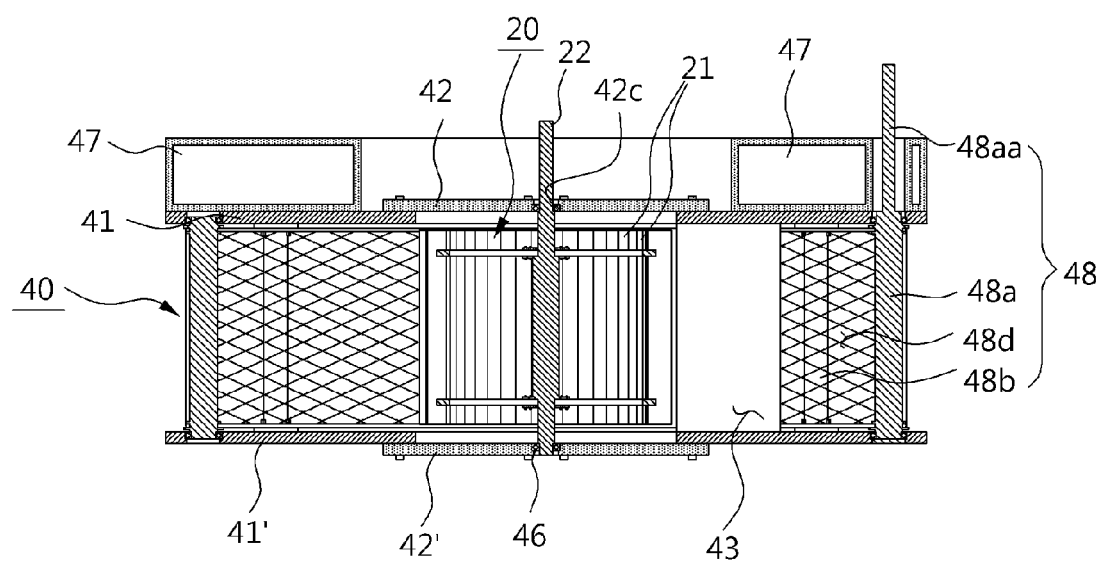
Figure 5D:
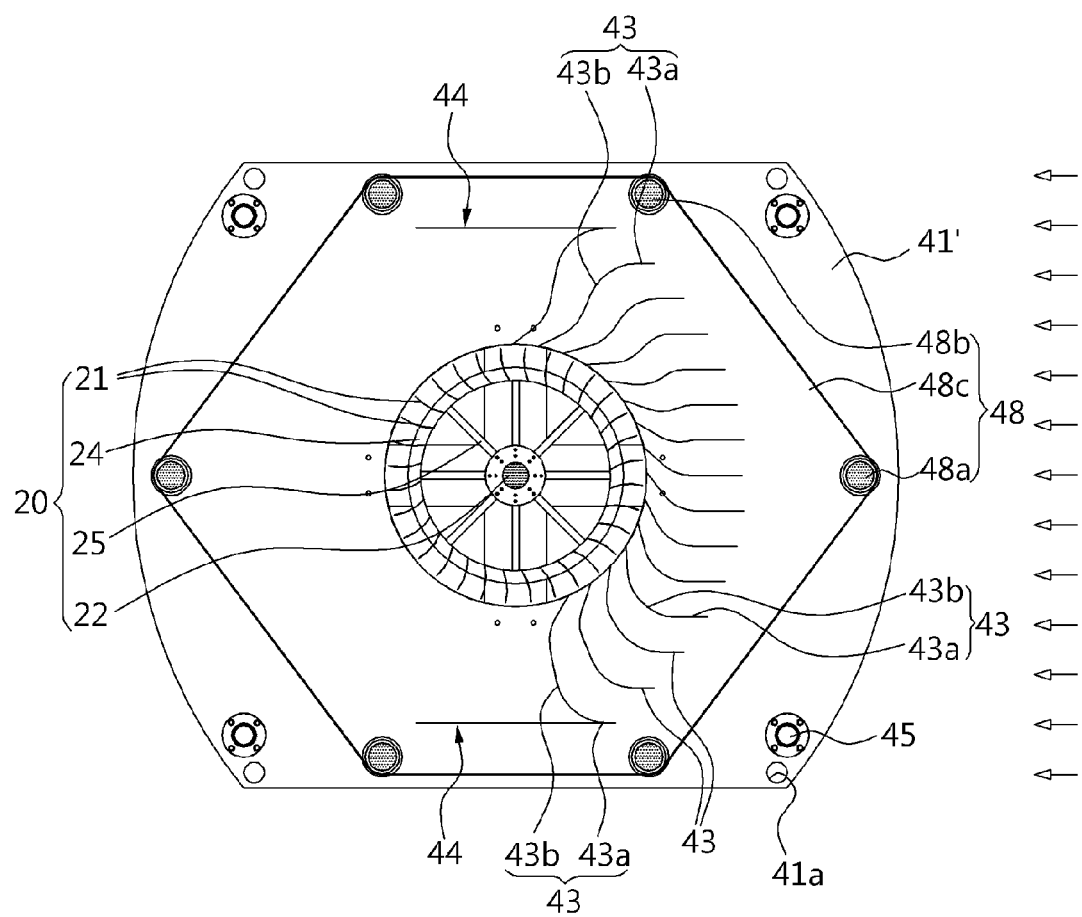
FIG. 5d is a cross-sectional view taken along line K-K of FIG. 5b.

FIG. 5a is a schematic plan view illustrating a multipurpose rotary device according to a fourth embodiment of the present invention, FIG. 5b is the schematic side view illustrating the multipurpose rotary device according to the fourth embodiment of the present invention. FIG. 5c is a cross-sectional view taken along line J-J of FIG. 5a, FIG. 5d is a cross-sectional view taken along line K-K of FIG. 5b.

The multipurpose rotary device according to the fourth embodiment is configured such that the rotational force is effectively obtained due to the unidirectional loads in which the fluids that flow in one direction such as running water of the river or streams flow. In addition, the multipurpose rotary device includes a rotor 20 including a plurality of blades 21 in a circumferential direction, and a load guide body 40 configured to guide the flow of the fluids that are flowing into the rotor 20. The load guide body 40 includes an upper support member 41 and a lower support member 41', an upper base plate 42 and a lower base plate 42', load guide plates 43, and resistance prevention plates 44.

Since the rotor 20 may be formed in the same manner as or a similar manner to those of the first to third embodiments described above, the detailed description thereof will be omitted and a description focusing on the load guide body 40 will described below.

The upper base plate 42 and the lower base plate 42' are members that are formed to be extended from the upper support member 41 and the lower support member 41' such that the flow path in which the fluids move is formed, and are vertically installed to be spaced apart by base pillars 45. In addition, the center portion thereof is coupled to the inside of the edge of the upper support member 41 and the lower support member 41' by the bolts.

Although a shape of the upper base plate 42 and the lower base plate 42' is not limited, as illustrated in FIG. 5a, they have the approximate shield shape, connection holes 41a are formed in the edge thereof such that the multipurpose rotary devices that are installed to be in contact with each other can be connected to one another by ropes or wires.

The upper support member 41 and the lower support member 41' have the same or similar form such that they are connected to one another to be disposed to face each other at the upper and lower sides, and, in this embodiment, are installed such that the output shaft 22 of the rotor can be rotated by the bearing 46 inserted into the bearing insertion hole 42c that is formed to be penetrated through the center in an approximately cross shape.

The load guide plates 43 are disposed to guide the loads of the fluids to a space between the upper base plate 42 and the lower base plate 42' that corresponds to an inflow direction of the fluids using the blades 21, and are characterized in that they are configured such that the fluids that are flowing into the spaces between the load guide plates 43 are not escaped to the outside and are guided toward the blades 21. To this end, as illustrated in FIG. 5d, the load guide plates 43 are configured as straight line sections 43a that are formed in a linear form parallel with the inflow direction of the fluids, and bending portions 43b that are bent at the end of the straight line sections 43a in the rotational direction of the rotor 20 and are formed up to a place close to the outer circumferential edge of the blades 21.

Like this, when the load guide plates 43 are configured as the straight line sections 43a and the bending portions 43b, the rotational force can be obtained in the wide range of angle. In addition, since the fluids that are flowing into the spaces between the straight line sections 43a and the bending portions 43b are not escaped to the outside and are guided toward the blades 21, the relatively large rotational force can be obtained relative to the predetermined loads of the fluids.

The resistance prevention plates 44 are members that are disposed at both edge portions of the flow path of the fluids in the flow direction of the fluids to minimize a rotational resistance of the rotor 20. In addition, as the resistance prevention plates 44 are disposed in a linear form from the straight line sections 43a of the load guide plates 43 that are located at both edge portions of the upper base plate 42 and the lower base plate 42' in the movement direction of the fluids, the fluids are not flowing into the blades 21 of the rotor 20 that corresponds to the discharge direction of the fluids.

Meanwhile, in consideration of the fact that the multipurpose rotary device according to the fourth embodiment is to be installed on the water such the river or streams, the multipurpose rotary device further includes a buoyant body 47 configured to provide buoyancy for flotage, and foreign substance inflow prevention means 48 configured to prevent foreign substances from being flowing into the internal space between the upper base plate 42 and the lower base plate 42'.

As long as buoyancy can be effectively generated, the buoyant body 47 may be installed at various positions such as the upper base plate 42, the lower base plate 42', and the space between the upper and lower base plates, without limitation of the positions, and is configured to be fixed on the upper portion of the upper base plate 42 by left and right fixing bars 47a, for example, as illustrated in FIG. 5a to FIG. 5c.

The foreign substance inflow prevention means 48 is configured as a main roller 48a and an auxiliary roller 48b that surround the load guide body 40 and are rotatably installed at the upper and lower base plates 42 and 42', vertical wires 48c that are vertically wound to the main roller 48a and the auxiliary roller 48b, and nets 48d that are fixed in the vertical wires 48c.

Like this, when the foreign substance inflow prevention means 48 is included therein, although the multipurpose rotary device according to this embodiment is installed on the river or streams, and then, in the process of using a waterwheel (turbine) for generating, foreign substances flow between the upper base plate and the lower base plate as well as the fluids, the foreign substances can be easily filtered and removed. When a predetermined period of time elapses, if the rotational force is applied to an upper grip portion 48aa of the main roller 48a to operate the device such that the vertical wires 48c are rotated along the auxiliary roller 48b, the net 48d is interlocked to the operation and moved. Therefore, the attached foreign substances are automatically separated and removed. As a result, water power generation can be conveniently and safely performed.

Figure 5E:
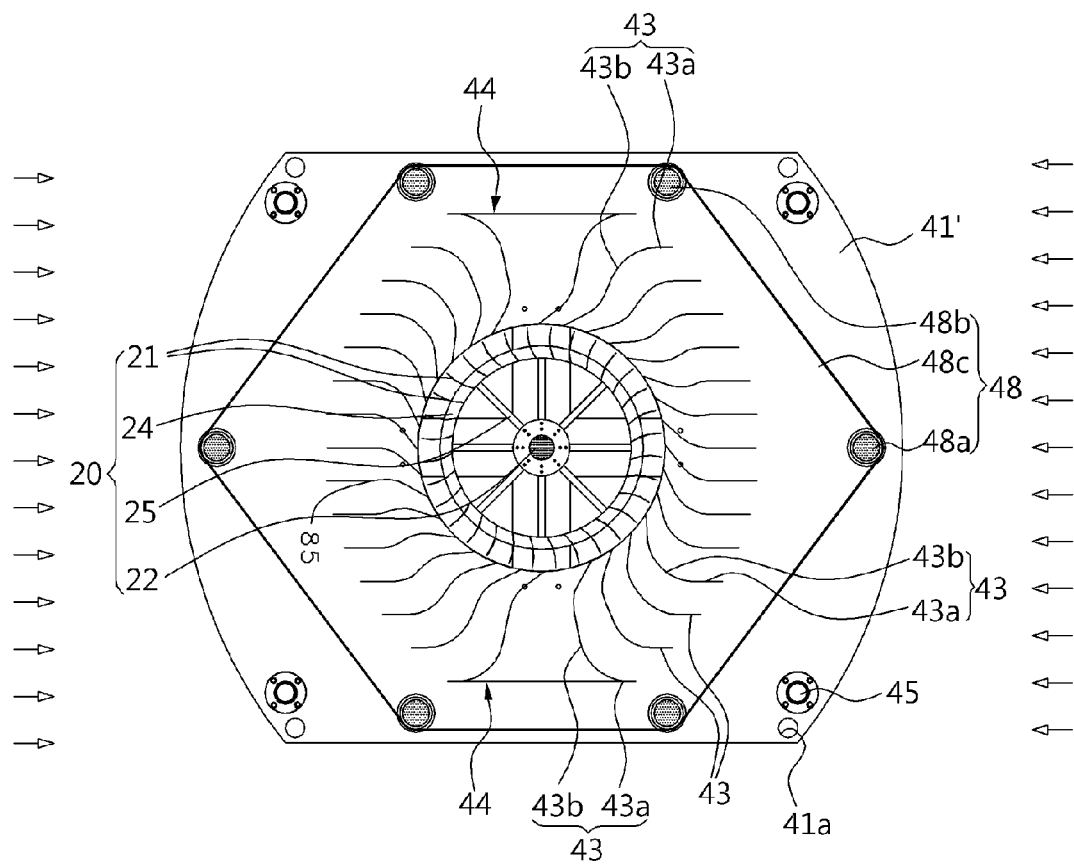
FIG. 5e is a schematic plane cross-sectional view illustrating a modified example of the multipurpose rotary device according to the fourth embodiment of the present invention.

FIG. 5e is a schematic plane cross-sectional view illustrating a modified example of the multipurpose rotary device according to the fourth embodiment of the present invention.

Referring to FIG. 5e, the multipurpose rotary device according to the modified example of the fourth embodiment is configured such that the multipurpose rotary device is applicable, as a waterwheel (turbine), to a generating device in which the flow direction of the fluids are changed in both directions every time a predetermined time elapses, such as tidal power generation using differences in tidal.

To this end, the multipurpose rotary device is configured such that the load guide body 40 is configured as the upper base plate 42, the lower base plate 42', the upper support member 41, the lower support member 41', the load guide plates 43, and the resistance prevention plates 44, and the load guide plates 43 are formed to be disposed in an internal space between the resistance prevention plates 44 in both directions based on the rotor 20.

In this case, in order to minimize the rotational resistance of the rotor 20, as the resistance prevention plates 44 are disposed in a linear form in the movement direction of the fluids such that the straight line sections 43a of the load guide plates 43 that are located at both edge portions are connected to one another, although the flow direction of the fluids is changed between one direction and the other direction, it is configured such that the fluids are not flowing into the blades 21 of the rotor 20 that corresponds to the discharge direction of the fluids.

Figure 6A:
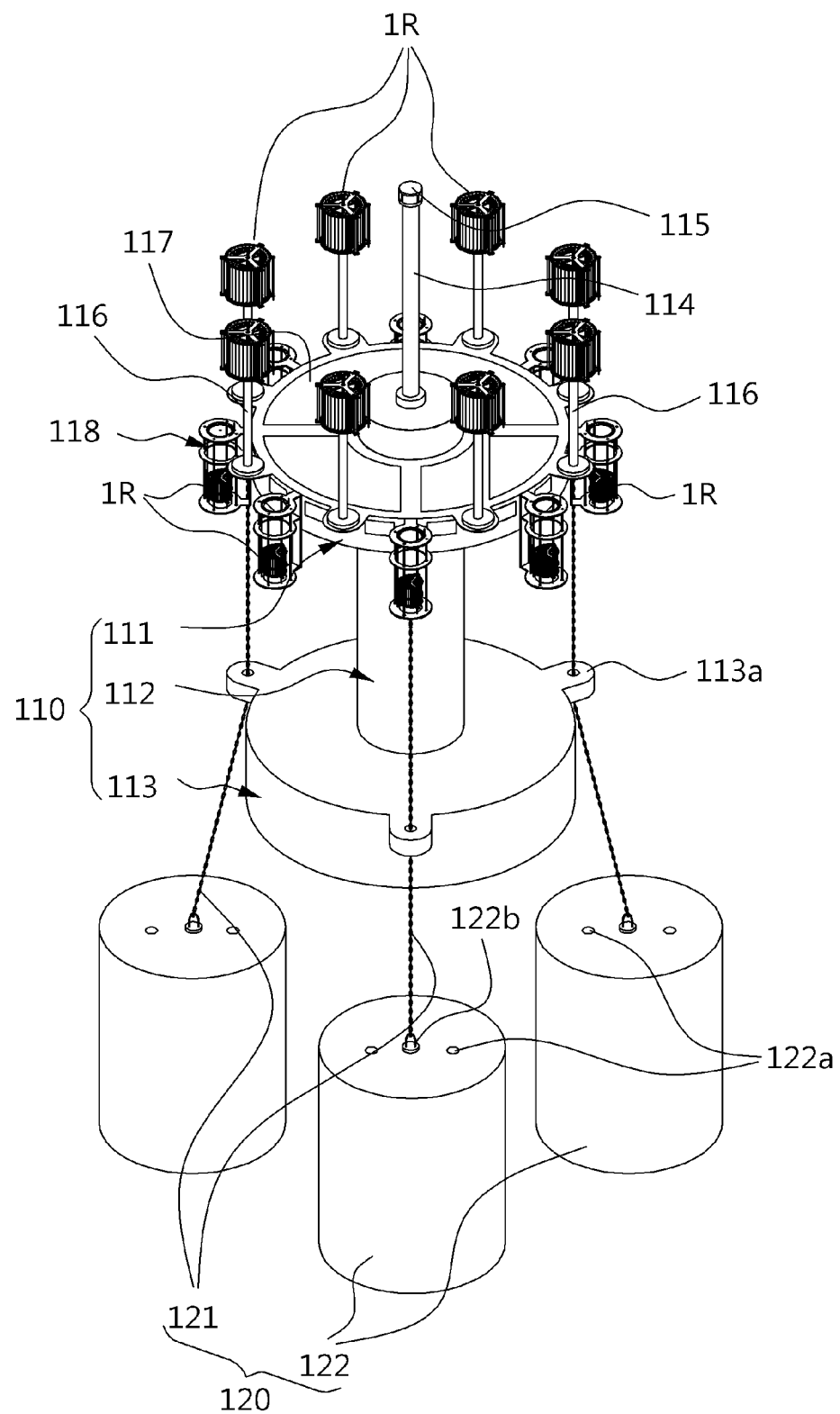
FIG. 6a is a perspective view illustrating a generating system including the multipurpose rotary device according to the first embodiment of the present invention.
Figure 6B:
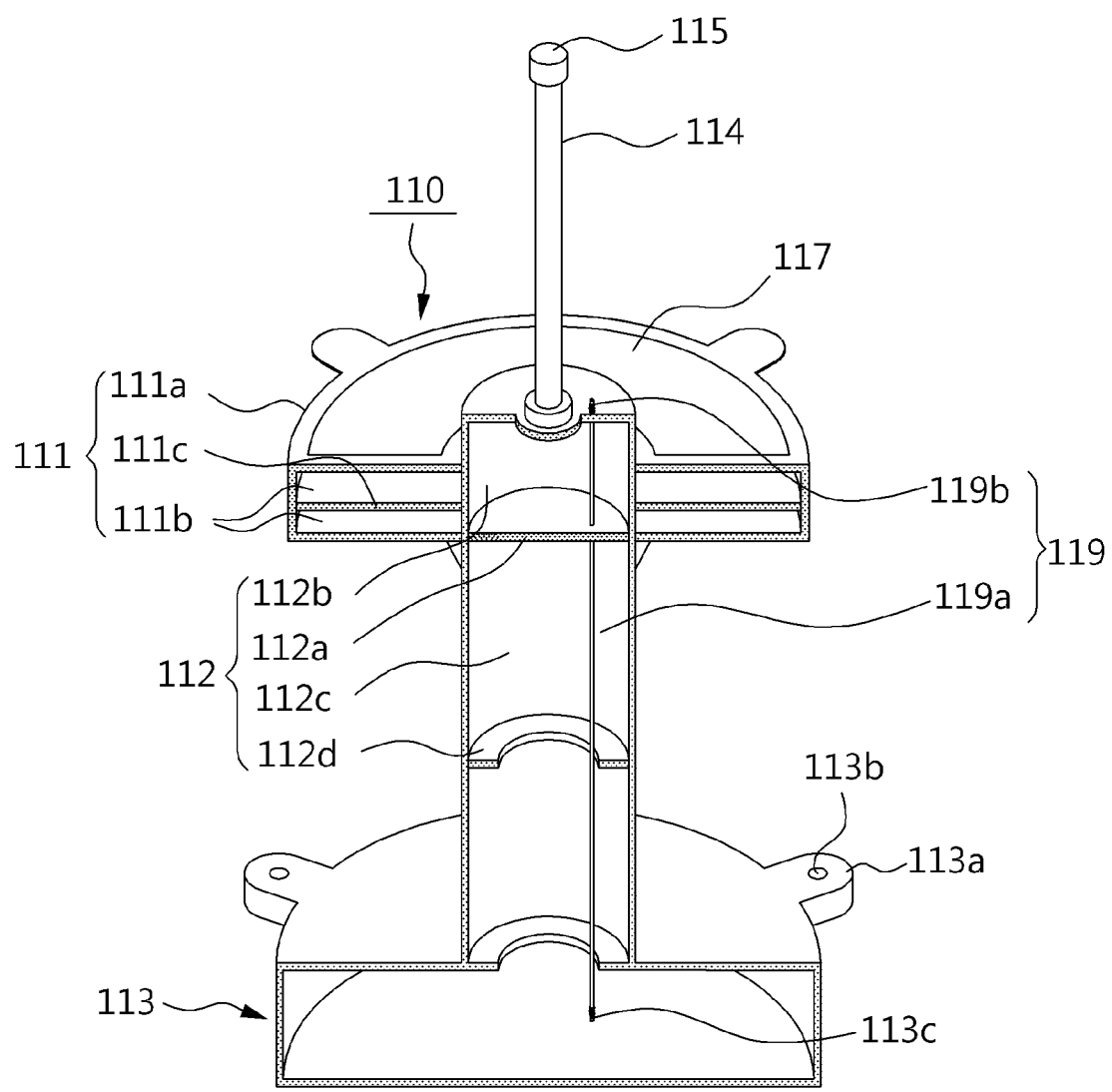
FIG. 6b is a full sectional view illustrating a rotary device installation structure of the generating system including the multipurpose rotary device according to the first embodiment of the present invention.

FIG. 6a is a perspective view illustrating a generating system including the multipurpose rotary device according to the first embodiment of the present invention. FIG. 6b is a full sectional view illustrating a rotary device installation structure of the generating system including the multipurpose rotary device according to the first embodiment of the present invention.

The generating system including the multipurpose rotary device according to the present invention includes the multipurpose rotary device 1R described in the first to fourth embodiments, and a rotary device installation structure 100 that includes the plurality of multipurpose rotary devices 1R and is installed on the water such as the sea, a reservoir, and dam. In this embodiment, the generating system is configured as a sea structure that can be moved while floating. As such, it is possible to implement as a generating facility unit on the regions of islands or the sea that power supply is in difficult or poor circumstances.

As illustrated in FIG. 6a, the rotary device installation structure 100 includes a water floating body 110 that has a buoyancy chamber to be floated on water, and fixing means 120 for fixing to prevent the water floating body 110 from being rocked or turned over on water.

The water floating body 110 includes an upper structure 111 that is located above the surface of water and has a hollow portion formed therein, a central column 112 that is formed to be connected to the upper structure 111 in a longitudinal direction, and a lower water tank 113 that is connected to the lower end of the central column 112, is submerged in water, and has a hollow portion capable of receiving a liquid such as sea water therein.

As illustrated in FIG. 6a and FIG. 6b, the upper structure 111 includes a lighthouse pillar 114 having a lighthouse chamber 115 provided above the center of an upper body 111a in which a plurality of space sections 111b that are divided into the upper and lower sides by a partition wall 111c are provided, and a plurality of rotor pillars 116 used for installation of the multipurpose rotary device 1R to the peripheral of the edge of the upper body 111a. As necessary, the upper side of the upper body may be equipped with a solar-cell panel 117 that can convert sunlight into electrical energy to generate. Here, it is preferable that the upper body 111a be formed in a thin disc-like with a large surface area so as not to be rocked or turned over at the time of application of an external force such as the waves.

In addition, the upper structure 111 includes vertical movement means 118 that can fix vertically movably the multipurpose rotary device 1R to the outer circumferential edge thereof. As long as it can cause the multipurpose rotary device to be submerged in water in a case of generating using the loads of the fluids in water and it can cause the multipurpose rotary device 1R to be towed and elevated in water in the case such as when windstorms or tidal waves are generated or during maintenance, The vertical movement means 118 may be configured to employ various towing apparatuses such as a hoist and a chain block.

As illustrated in FIG. 6b, the central column 112 is configured to be divided into pillar upper space 112b that is divided and defined by the partition wall 112a in the upper portion thereof corresponding to the center portion of the upper structure 111, and pillar lower space 112c that has the plurality of reinforcement rings 112d attached thereon and is communicated with the lower water tank 113.

The lower water tank 113 has a shape similar to that of the upper structure 111, includes a plurality of connection protrusions 113a having a chain insertion hole 113b formed at the edge of the upper side, and has a bottom thereof equipped with an input and output valve 113c for inputting and outputting water.

In addition, the water floating body 110 may include an injection amount adjustment device 119 such that an injection amount of the fluids received therein when the water floating body 110 is moved or installed can be adjusted. The injection amount adjustment device 119 may be configured as an adjustable pipe 119a that is installed in a longitudinal direction such that the fluids can be injected into the lower water tank 113 and the central column 112 or are discharged from the inside to the outside, and an adjustable valve 119b that installed at the upper exposed portion of the adjustable pipe 119a. In this case, the adjustable pipe 119a includes a flow port (not illustrated) that is communicated with the internal space of the lower water tank 113 and the central column 112 in order to flow in and flow out the fluids. In addition, it is preferable that the input and output valve 113c and the adjustable valve 119b be configured as an automatic adjustment valve capable of performing automatic adjustment or remote adjustment.

Meanwhile, the fixing means 120 includes connecting wires 121 each of which has one end connected to the upper structure 111 of the water floating body 110 and are inserted into the chain insertion holes 113b of the lower water tank 113 to be connected to weight bodies 122 to be described, and the weight bodies 122 that are connected to the other end of the connecting wires 121. The weight body 122 has a receiving space capable of receiving water therein and is formed with input and output holes 122a for inputting and outputting water at the upper and lower sides. In addition, a connecting link 122b that is used for connection to the connecting wire 121 is coupled to the upper side of the weight body 122.

Like this, the generating system including the multipurpose rotary device according to the present invention not only convert all of the loads of wave power, tidal power, and wind power into electrical energy on the sea but also includes the lighthouse chamber 115 to be used effectively as the generating system on the sea. In particular, since the water floating body 110 has a hollow structure, the generating system is easily moved. Therefore, after the generating system is moved to the installation place, when water is injected into the internal space, the generating system is more firmly fixed according to the weight of water. As such, although the generating system is located on the sea, the generating system can be maintained in a stable installation state without being rocked or turned over due to typhoon or tidal waves.

As describe above, although the present invention has been described through the limited examples and drawings, the present invention is not limited thereto. It should be understood by those skilled in the art that various modifications, combinations, sub-combinations and alterations may occur depending on design requirements and other factors insofar as they are within the scope of the appended claims or the equivalents thereof.

INDUSTRIAL APPLICABILITY

Since the generating system including the multipurpose rotary device according to the present invention can obtain the large rotational force relative to the loads of water power, wave power, tidal power, wind power and the like, the generating system is applicable to various generating systems that use nature energy such as water power, wave power, tidal power, and wind power to produce electrical energy.

The invention claimed is:
1. A multipurpose rotary device comprising:
a rotor configured to include a plurality of blades in a circumferential direction; and
a load guide body configured to guide a flow of fluids flowing into the inside of the rotor,
wherein the load guide body includes
an upper support member and a lower support member configured to be disposed to face each other at the upper and lower sides thereof and connected to one another such that the rotor is rotatably installed;
load guide plates configured to correspond to the blades and are rotatably installed between the upper and lower support members in a longitudinal direction; and
stop pins configured to be formed on inner surfaces facing the upper and lower support members to control a rotational angle of the load guide plates, and
wherein the stop pins are configured as inside stop pins and outside stop pins such that a space in which the load guide plates are rotated is defined, and are configured to be distributed equally in a circular shape in a number corresponding to the load guide plates, and
wherein the load guide plates are rotatably inserted by a space between the stop pins, have guide plate hinge members having a hinge shaft insertion hole that are coupled to the upper and lower ends, and are rotatably installed at the upper and lower support members by a guide plate rotary shaft bolt fastened to the hinge shaft insertion hole.
2. The multipurpose rotary device according to claim 1, wherein the upper and lower support members include annular rings formed with the stop pins, a plurality of connection sections disposed to traverse a center of the annular rings, and a bearing insertion hole formed to penetrate through a center of the connection sections, are coupled to one another by support columns installed in a longitudinal direction, and a shaft column is installed at a side of a bearing insertion hole of the lower support member.

3. The multipurpose rotary device according to claim 1, further comprising:
load adjustment opening and closing means configured to open and close selectively the load guide plates such that a loading amount of the fluids guided to the rotor is able to be adjusted or loads of the guided fluids are able to be blocked.
4. The multipurpose rotary device according to claim 3, wherein the load adjustment opening and closing means includes
a plurality of rotational members configured to be formed with fastening pieces such that a rotational space in which the upper and lower sides of the load guide plates are inserted and rotated is defined, and are rotatably installed between the stop pins,
rotational chain gears configured to be connected to the load guide plates and the rotational members,
a rotational chain configured to rotate the rotational chain gears, and
an opening and closing means driving unit configured to transmit power to rotate the rotational chain, and
wherein the load guide plates are configured to be rotated between the fastening pieces and the rotational members are configured to be rotational within a rotational interval of the stop pins.
5. The multipurpose rotary device according to claim 4, wherein the opening and closing means driving unit includes
a load opening and closing shaft configured to receive external power;
a driving super gear configured to be coupled to the upper and lower ends of the load opening and closing shaft; and
an auxiliary gear configured to have a super gear meshed with the driving super gear and a chain gear engaged with a side of the rotational chain which are formed as one body, and is rotatably installed at the upper and lower support members by a shaft.
6. The multipurpose rotary device according to claim 1, further comprising:
load and weight adjustment means configured to be formed in the inside of the rotor to smooth the loads of the fluids that are flowing into the inside of the load guide body and are exerted to the rotor to an even unidirectional rotational force and adjust the weight of the multipurpose rotary device.
7. The multipurpose rotary device according to claim 6, wherein the load and weight adjustment means includes
a load and weight adjustment body configured to have flywheel spaces for receiving the fluids and buoyancy spaces for adjusting buoyancy that are formed to be divided in the inside of a body having a vertically protruded output shaft, each of the spaces has an adjustment hole; and
unidirectional bearings configured to have a structure to be rotatable only in one direction, which are inserted into the upper and lower sides of the output shaft.
8. A generating system comprising:
the multipurpose rotary device according to claim 1; and
a rotary device installation structure configured such that the at least one multipurpose rotary device is installed.
9. The generating system according to claim 8, wherein the rotary device installation structure includes
a water floating body configured to have a buoyancy chamber to be floated on water; and
fixing means configured to have at least one connecting wire having one end connected to the water floating body and a weight body connected to the other end of the connecting wire to fix the water floating body such that the water floating body is not rocked or turned over on water.

10. A multipurpose rotary device comprising:
a rotor configured to include a plurality of blades in a circumferential direction; and
a load guide body configured to guide a flow of fluids flowing into the inside of the rotor,
wherein the load guide body includes
an upper support member and a lower support member configured to be disposed to face each other at the upper and lower sides thereof, and connected to one another such that the rotor is rotatably installed;
an upper base plate and a lower base plate configured to be formed to be extended from the upper support member and the lower support member;
load guide plates configured to be disposed to guide the loads of the fluids to a space between the upper base plate and the lower base plate that corresponds to an inflow direction of the fluids using the blades; and
resistance prevention plates configured to be disposed at both edges of a flow path of the fluids in the flow direction of the fluids, and are connected and installed to the load guide plates to minimize a rotational resistance of the rotor.

11. The multipurpose rotary device according to claim 10, wherein the load guide plates are configured to be disposed at an internal space between the resistance prevention plates in one direction or both directions based on the rotor.

12. The multipurpose rotary device according to claim 11, wherein the load guide plates are configured as straight line sections that are formed in a linear form parallel with the inflow direction of the fluids and bending portions that are bent at the end of the straight line sections in the rotational direction of the rotor and are formed up to a place close to the outer circumferential edge of the blades, and are configured such that the fluids flowing into a space between the load guide plates are not escaped to the outside and are guided toward the blades.

13. The multipurpose rotary device according to claim 11, further comprising:
a buoyant body configured to be installed at the upper base plate or the lower base plate to provide buoyancy for flotage.

14. The multipurpose rotary device according to claim 11, further comprising:
foreign substance inflow prevention means configured to be configured such that foreign substances are not flowing into the internal space between the upper base plate and the lower base plate.

15. The multipurpose rotary device according to claim 14, wherein the foreign substance inflow prevention means includes a main roller and an auxiliary roller configured to be rotatably installed at the upper and lower base plates to surround the load guide body;
vertical wires configured to be wound vertically to the main roller and the auxiliary roller; and
nets configured to be fixed in the vertical wires.

16. A generating system comprising:
the multipurpose rotary device according to claim 10; and
a rotary device installation structure configured such that the at least one multipurpose rotary device is installed.

17. The generating system according to claim 16, wherein the rotary device installation structure includes
a water floating body configured to have a buoyancy chamber to be floated on water; and
fixing means configured to have at least one connecting wire having one end connected to the water floating body and a weight body connected to the other end of the connecting wire to fix the water floating body such that the water floating body is not rocked or turned over on water.

18. The multipurpose rotary device according to claim 10, further comprising:
load and weight adjustment means configured to be formed in the inside of the rotor to smooth the loads of the fluids that are flowing into the inside of the load guide body and are exerted to the rotor to an even unidirectional rotational force and adjust the weight of the multipurpose rotary device.

19. The multipurpose rotary device according to claim 18, wherein the load and weight adjustment means includes
a load and weight adjustment body configured to have flywheel spaces for receiving the fluids and buoyancy spaces for adjusting buoyancy that are formed to be divided in the inside of a body having a vertically protruded output shaft, each of the spaces has an adjustment hole; and
unidirectional bearings configured to have a structure to be rotatable only in one direction, which are inserted into the upper and lower sides of the output shaft.

* * * * *